(12) United States Patent
Carnes

(10) Patent No.: US 9,106,633 B2
(45) Date of Patent: Aug. 11, 2015

(54) SYSTEMS AND METHODS FOR AUTHENTICATING MOBILE DEVICE COMMUNICATIONS

(75) Inventor: Daniel Wilson Carnes, Bellevue, NE (US)

(73) Assignee: First Data Corporation, Greenwood Village, CO (US)

( * ) Notice: Subject to any disclaimer, the term of this patent is extended or adjusted under 35 U.S.C. 154(b) by 348 days.

(21) Appl. No.: 13/481,364

(22) Filed: May 25, 2012

(65) Prior Publication Data

US 2012/0304255 A1    Nov. 29, 2012

Related U.S. Application Data

(60) Provisional application No. 61/490,501, filed on May 26, 2011.

(51) Int. Cl.
| | |
|---|---|
| G06F 21/00 | (2013.01) |
| H04L 29/06 | (2006.01) |
| H04L 9/32 | (2006.01) |
| H04W 12/02 | (2009.01) |
| G06Q 40/00 | (2012.01) |

(Continued)

(52) U.S. Cl.
CPC .............. H04L 63/08 (2013.01); G06Q 40/00 (2013.01); H04L 9/3234 (2013.01); H04W 12/02 (2013.01); G06Q 20/00 (2013.01); H04L 63/061 (2013.01); H04L 63/126 (2013.01); H04L 2209/80 (2013.01); H04L 2463/061 (2013.01); H04L 2463/062 (2013.01); H04W 4/001 (2013.01)

(58) Field of Classification Search
CPC ... H04L 9/3234; H04L 9/3228; H04L 9/3236; H04L 2209/80; H04L 3/061; H04L 2463/062; H04L 2463/061; H04L 63/126; H04L 63/08; H04W 12/02; H04W 12/04; H04W 12/06; H04W 4/001; H04W 8/02

USPC ............... 726/2, 3, 11, 12; 713/160, 161, 181

See application file for complete search history.

(56) References Cited

U.S. PATENT DOCUMENTS

| | | | | |
|---|---|---|---|---|
| 5,491,750 | A | * | 2/1996 | Bellare et al. ............... 713/155 |
| 6,044,350 | A | * | 3/2000 | Weiant et al. ................. 705/76 |
| 6,084,969 | A | * | 7/2000 | Wright et al. ............... 380/271 |

(Continued)

OTHER PUBLICATIONS

Mid Tex Federal Credit Union, Mid-Texan 1st Quarter Newsletter, Mar. 31, 2009. See pp. 7-8 'Tellers Tips' http://www.mtfcu.org/Newsletter%202.htm.

(Continued)

Primary Examiner — Catherine Thiaw
(74) Attorney, Agent, or Firm — Sutherland Asbill & Brennan LLP

(57) ABSTRACT

Embodiments of the invention provide systems and methods for authenticating mobile device communications. A mobile device to which a message will be communicated may be identified. Based upon a shared secret between a service provider and the mobile device, a payload authentication code ("PAC") may be generated, and the generated PAC may be associated with a payload for the message. The message and the generated PAC may then be communicated to the mobile device, and the mobile device may be configured to utilize the shared secret to verify the PAC and authenticate the message. In certain embodiments, the operations of the method may be performed by one or more computers associated with the service provider.

21 Claims, 5 Drawing Sheets

(51) Int. Cl.
*H04W 4/00* (2009.01)
*G06Q 20/00* (2012.01)

(56) References Cited

U.S. PATENT DOCUMENTS

| | | | |
|---|---|---|---|
| 6,163,771 | A | 12/2000 | Walker et al. |
| 6,422,462 | B1 | 7/2002 | Cohen |
| 6,931,382 | B2 | 8/2005 | Laage et al. |
| 7,213,147 | B2 * | 5/2007 | Tuvell et al. ............... 713/166 |
| 7,353,388 | B1 | 4/2008 | Gilman et al. |
| 7,548,621 | B1 | 6/2009 | Smith et al. |
| 7,702,553 | B1 | 4/2010 | Dickelman |
| 7,702,577 | B1 | 4/2010 | Dickelman |
| 8,078,867 | B2 * | 12/2011 | Brown et al. ............... 713/161 |
| 8,099,363 | B1 | 1/2012 | Kilchenstein, Jr. |
| 8,386,381 | B1 | 2/2013 | Barton et al. |
| 8,413,894 | B2 | 4/2013 | Bona et al. |
| 8,423,548 | B1 | 4/2013 | Trandal et al. |
| 8,489,740 | B2 * | 7/2013 | Schneider ................... 709/225 |
| 8,560,849 | B2 * | 10/2013 | Machani et al. ............ 713/168 |
| 8,627,092 | B2 * | 1/2014 | Fischer et al. .............. 713/181 |
| 8,689,012 | B1 | 4/2014 | Bierbaum et al. |
| 8,752,127 | B2 | 6/2014 | Musfeldt et al. |
| 8,775,305 | B2 | 7/2014 | Pointer |
| 8,880,886 | B2 | 11/2014 | Kean et al. |
| 2001/0029485 | A1 | 10/2001 | Brody et al. |
| 2002/0091646 | A1 | 7/2002 | Lake et al. |
| 2002/0128977 | A1 | 9/2002 | Nambiar et al. |
| 2002/0133467 | A1 | 9/2002 | Hobson et al. |
| 2002/0147658 | A1 | 10/2002 | Kwan |
| 2002/0156689 | A1 | 10/2002 | Spalding |
| 2003/0014360 | A1 | 1/2003 | Arditti et al. |
| 2003/0023549 | A1 | 1/2003 | Armes et al. |
| 2004/0030659 | A1 | 2/2004 | Gueh |
| 2004/0031856 | A1 | 2/2004 | Atsmon et al. |
| 2004/0123102 | A1 * | 6/2004 | Gehrmann et al. .......... 713/161 |
| 2004/0155101 | A1 | 8/2004 | Royer et al. |
| 2004/0159700 | A1 | 8/2004 | Khan et al. |
| 2004/0172340 | A1 | 9/2004 | Bishop et al. |
| 2005/0092839 | A1 | 5/2005 | Oram |
| 2005/0182855 | A1 * | 8/2005 | Apostolopoulos et al. ... 709/247 |
| 2005/0198506 | A1 | 9/2005 | Qi et al. |
| 2005/0221814 | A1 | 10/2005 | Fagan et al. |
| 2005/0250538 | A1 | 11/2005 | Narasimhan et al. |
| 2005/0269402 | A1 | 12/2005 | Spitzer et al. |
| 2005/0279827 | A1 | 12/2005 | Mascavage et al. |
| 2006/0000900 | A1 | 1/2006 | Fernandes et al. |
| 2006/0040642 | A1 | 2/2006 | Boris et al. |
| 2006/0064458 | A1 * | 3/2006 | Gehrmann ................... 709/203 |
| 2006/0077034 | A1 | 4/2006 | Hillier |
| 2006/0131410 | A1 | 6/2006 | Fernandes et al. |
| 2006/0179305 | A1 | 8/2006 | Zhang |
| 2006/0206350 | A1 | 9/2006 | Edwards et al. |
| 2006/0251257 | A1 * | 11/2006 | Haverinen et al. ........... 380/270 |
| 2007/0063024 | A1 | 3/2007 | Guillot |
| 2007/0091843 | A1 | 4/2007 | Patel et al. |
| 2007/0180262 | A1 | 8/2007 | Benson |
| 2007/0203732 | A1 | 8/2007 | Griegel et al. |
| 2008/0010217 | A1 | 1/2008 | Hobson et al. |
| 2008/0037785 | A1 * | 2/2008 | Gantman et al. ............. 380/259 |
| 2008/0049940 | A1 | 2/2008 | Kocher |
| 2008/0052183 | A1 | 2/2008 | Hobson et al. |
| 2008/0126252 | A1 | 5/2008 | Katz |
| 2008/0130902 | A1 | 6/2008 | Foo Kune et al. |
| 2008/0136592 | A1 | 6/2008 | Malik et al. |
| 2008/0141031 | A1 | 6/2008 | Oba et al. |
| 2008/0162929 | A1 * | 7/2008 | Ishikawa et al. ............. 713/160 |
| 2008/0257952 | A1 | 10/2008 | Zandonadi |
| 2008/0288404 | A1 | 11/2008 | Pirzadeh et al. |
| 2008/0303665 | A1 | 12/2008 | Naik et al. |
| 2008/0305772 | A1 | 12/2008 | Balasubramanian et al. |
| 2009/0006262 | A1 | 1/2009 | Brown et al. |
| 2009/0068988 | A1 | 3/2009 | Cofta |
| 2009/0074189 | A1 * | 3/2009 | Ryu et al. .................... 380/277 |
| 2009/0099961 | A1 | 4/2009 | Ogilvy |
| 2009/0108064 | A1 | 4/2009 | Fernandes et al. |
| 2009/0132424 | A1 | 5/2009 | Kendrick et al. |
| 2009/0134217 | A1 | 5/2009 | Flitcroft et al. |
| 2009/0157557 | A1 | 6/2009 | Hobson et al. |
| 2009/0164774 | A1 * | 6/2009 | Sherkin ........................ 713/155 |
| 2009/0173784 | A1 | 7/2009 | Yang |
| 2009/0181644 | A1 | 7/2009 | Humphrey et al. |
| 2009/0235065 | A1 | 9/2009 | Nilsson et al. |
| 2009/0248581 | A1 | 10/2009 | Brown |
| 2009/0307482 | A1 | 12/2009 | McCann |
| 2010/0005307 | A1 * | 1/2010 | Prashanth .................... 713/176 |
| 2010/0106967 | A1 | 4/2010 | Johansson et al. |
| 2010/0111306 | A1 * | 5/2010 | Zheng et al. ................. 380/270 |
| 2010/0116881 | A1 | 5/2010 | Flood et al. |
| 2010/0161778 | A1 | 6/2010 | Guinard et al. |
| 2010/0174647 | A1 | 7/2010 | Bouchard |
| 2010/0191966 | A1 * | 7/2010 | Immonen ..................... 713/168 |
| 2010/0192220 | A1 | 7/2010 | Heizmann et al. |
| 2010/0241847 | A1 | 9/2010 | van der Horst et al. |
| 2010/0257360 | A1 | 10/2010 | Bae et al. |
| 2010/0274691 | A1 | 10/2010 | Hammad et al. |
| 2010/0280950 | A1 | 11/2010 | Faith et al. |
| 2010/0293094 | A1 | 11/2010 | Kolkowitz et al. |
| 2011/0010538 | A1 * | 1/2011 | Falk et al. .................... 713/155 |
| 2011/0047072 | A1 | 2/2011 | Ciurea |
| 2011/0047075 | A1 | 2/2011 | Fourez |
| 2011/0087547 | A1 | 4/2011 | Amaro et al. |
| 2011/0087596 | A1 | 4/2011 | Dorsey |
| 2011/0101109 | A1 | 5/2011 | Bona et al. |
| 2011/0137802 | A1 | 6/2011 | Spies et al. |
| 2011/0154021 | A1 * | 6/2011 | McCann et al. ............. 713/153 |
| 2011/0208965 | A1 * | 8/2011 | Machani ...................... 713/168 |
| 2011/0231270 | A1 | 9/2011 | Dykes et al. |
| 2011/0231319 | A1 | 9/2011 | Bayod et al. |
| 2011/0238575 | A1 | 9/2011 | Nightengale et al. |
| 2011/0264567 | A1 | 10/2011 | Clyne |
| 2011/0282789 | A1 | 11/2011 | Carroll et al. |
| 2011/0288918 | A1 | 11/2011 | Cervenka et al. |
| 2011/0309309 | A1 | 12/2011 | Hartmann et al. |
| 2011/0314274 | A1 * | 12/2011 | Swartz ......................... 713/160 |
| 2012/0017089 | A1 | 1/2012 | Kocher |
| 2012/0022945 | A1 | 1/2012 | Falkenborg et al. |
| 2012/0023022 | A1 | 1/2012 | Carroll et al. |
| 2012/0095857 | A1 | 4/2012 | McKelvey et al. |
| 2012/0097739 | A1 | 4/2012 | Babu et al. |
| 2012/0108295 | A1 | 5/2012 | Schell et al. |
| 2012/0109734 | A1 | 5/2012 | Fordyce, III et al. |
| 2012/0130839 | A1 * | 5/2012 | Koh et al. .................... 705/26.1 |
| 2012/0130898 | A1 | 5/2012 | Snyder et al. |
| 2012/0159105 | A1 | 6/2012 | von Behren et al. |
| 2012/0172089 | A1 | 7/2012 | Bae et al. |
| 2012/0174189 | A1 | 7/2012 | Lim et al. |
| 2012/0190386 | A1 | 7/2012 | Anderson |
| 2012/0197802 | A1 | 8/2012 | Smith et al. |
| 2012/0203698 | A1 | 8/2012 | Duncan et al. |
| 2012/0215610 | A1 | 8/2012 | Amaro et al. |
| 2012/0239479 | A1 | 9/2012 | Amaro et al. |
| 2012/0239574 | A1 | 9/2012 | Smith et al. |
| 2012/0296741 | A1 | 11/2012 | Dykes |
| 2012/0296824 | A1 | 11/2012 | Rosano |
| 2012/0300932 | A1 | 11/2012 | Cambridge et al. |
| 2012/0300938 | A1 | 11/2012 | Kean et al. |
| 2012/0303310 | A1 | 11/2012 | Musfeldt |
| 2012/0303496 | A1 | 11/2012 | Musfeldt |
| 2012/0303503 | A1 | 11/2012 | Cambridge et al. |
| 2012/0303961 | A1 | 11/2012 | Kean et al. |
| 2012/0304254 | A1 * | 11/2012 | Musfeldt et al. .................. 726/2 |
| 2012/0317019 | A1 | 12/2012 | Carnes |
| 2013/0133086 | A1 * | 5/2013 | Liberman et al. ............... 726/28 |
| 2013/0179695 | A1 | 7/2013 | Zollinger et al. |

OTHER PUBLICATIONS

Non-final Office Action for U.S. Appl. No. 13/481,352 mailed Jun. 13, 2013.
Non-final Office Action for U.S. Appl. No. 13/481,437 mailed Sep. 9, 2013.
Non-final Office Action for U.S. Appl. No. 13/481,377 mailed Oct. 10, 2013.

(56) References Cited

OTHER PUBLICATIONS

Non-final Office Action for U.S. Appl. No. 13/481,433 mailed Oct. 23, 2013.
Final Office Action for U.S. Appl. No. 13/481,352 mailed Dec. 17, 2013.
Notice of Allowance for U.S. Appl. No. 13/481,437 mailed Dec. 26, 2013.
Notice of Allowance for U.S. Appl. No. 13/481,377 mailed Jan. 28, 2014.
Non-final Office Action for U.S. Appl. No. 13/481,387 mailed Feb. 6, 2014.
Final Office Action for U.S. Appl. No. 13/481,433 mailed Apr. 10, 2014.
Non-final Office Action for U.S. Appl. No. 13/481,394 mailed May 21, 2014.
Final Office Action for U.S. Appl. No. 13/481,387 mailed Jun. 25, 2014.
Non-final Office Action for U.S. Appl. No. 13/481,356 mailed Jun. 27, 2014.
Notice of Allowance for U.S. Appl. No. 13/481,433 mailed Jun. 30, 2014.
Non-final Office Action response for U.S. Appl. No. 13/481,352 mailed Oct. 14, 2013.
Non-final Office Action response for U.S. Appl. No. 13/481,437 mailed Nov. 20, 2013.
Non-final Office Action response for U.S. Appl. No. 13/481,377 mailed Jan. 10, 2014.
Non-final Office Action response for U.S. Appl. No. 13/481,433 mailed Jan. 23, 2014.
Final Office Action response for U.S. Appl. No. 13/481,352 mailed Mar. 4, 2014.
Advisory Action for U.S. Appl. No. 13/481,352 mailed Mar. 14, 2014.
Advisory Action response for U.S. Appl. No. 13/481,352 mailed Mar. 17, 2014.
Non-final Office Action response for U.S. Appl. No. 13/481,387 mailed Apr. 21, 2014.
Final Office Action response for U.S. Appl. No. 13/481,433 mailed Jun. 10, 2014.
Non-final Office Action for U.S. Appl. No. 13/481,346 mailed Dec. 4, 2014.
Final Office Action for U.S. Appl. No. 13/481,356 mailed Dec. 12, 2014.

* cited by examiner

SYSTEMS AND METHODS FOR AUTHENTICATING MOBILE DEVICE COMMUNICATIONS

RELATED APPLICATION

This application claims priority to U.S. Ser. No. 61/490,501, titled "Trusted Service Manager," filed on May 26, 2011, the contents of which are incorporated herein by reference.

FIELD OF THE INVENTION

Embodiments of the invention relate generally to mobile devices, and more specifically to systems and methods for authenticating mobile device communications.

BACKGROUND OF THE INVENTION

Mobile devices, such as cell phones, personal digital assistants ("PDAs"), smart phones, and other similar devices, have increasingly been utilized to provide additional functionality beyond traditional voice communications. One component of enabling the mobile devices to support these additional functionalities includes installing software applications, such as wallet applications, on the mobile devices. Mobile device applications can facilitate a variety of services performed by or with the mobile devices, including payment applications (e.g., prepaid, credit, debit, etc.), loyalty or incentive applications, transportation payment applications, access control applications, entertainment applications, and the like. Given the sensitive nature of data that may be transmitted or communicated during the provision of a service, such as a payment service, authentication of information included in mobile device communications and/or the protection of data becomes critical. Accordingly, improved systems and methods for authenticating mobile device communications are desirable.

Additionally, service providers operating services associated with these applications, and thus providing the mobile device software applications, need to be able to interact with their customers regardless of the carrier network the customer uses for operating the mobile device. Accordingly, multiple service providers (e.g., card issuing banks, retailers, transit operators, etc.) need to load and manage applications (e.g., near field communication-based ("NFC-based") applications, etc.) onto mobile devices supported by multiple mobile network operators. Sharing confidential information through large numbers of individual relationships (i.e., between one service provider and one mobile network operator) is inefficient, requiring complex integration by the service providers for each mobile network operator supported, and by the mobile network operators for each service provider installing applications. Accordingly, there exists a need for providing trusted service management functionality and integration between multiple service providers and multiple mobile network operators. Additionally, there exists a need for a trusted service management system to authenticate mobile device communications to validate messages generated by or communicated to third party service provider applications.

BRIEF DESCRIPTION OF THE INVENTION

Embodiments of the invention may provide systems and methods for authenticating mobile device communications. According to one example embodiment of the invention, a method for authenticating communications is provided. A mobile device to which a message will be communicated may be identified. Based upon a shared secret between a service provider and the mobile device, a payload authentication code ("PAC") may be generated, and the generated PAC may be associated with a payload for the message. The message and the generated PAC may then be communicated to the mobile device, and the mobile device may be configured to utilize the shared secret to verify the PAC and authenticate the message. In certain embodiments, the operations of the method may be performed by one or more computers associated with the service provider.

According to another embodiment, a system for authenticating mobile device communications is provided. The system may include at least one memory and at least one processor. The at least one memory may be configured to store computer-executable instructions. The at least one processor may be configured to access the at least one memory and execute the computer-executable instructions to: identify a mobile device to which a message will be communicated; generate, based upon a shared secret between a service provider and the mobile device, a payload authentication code ("PAC"); associate the generated PAC with a payload for the message; and direct communication of the message and the generated PAC to the mobile device, wherein the mobile device is configured to utilize the shared secret to verify the PAC and authenticate the message.

According to yet another embodiment of the invention, a method for authenticating communications received by a mobile device is provided. A message may be received by a mobile device that includes one or more computer processors. The message may be a message that was output by a service provider. Based upon an analysis of the received message, a payload authentication code ("PAC") may be identified by the mobile device. Based at least in part upon a shared secret between the mobile device and the service provider, the PAC may be verified by the mobile device. Additionally, based at least in part upon the verification, a payload of the received message may be authenticated by the mobile device.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

DETAILED DESCRIPTION

Figure 1:
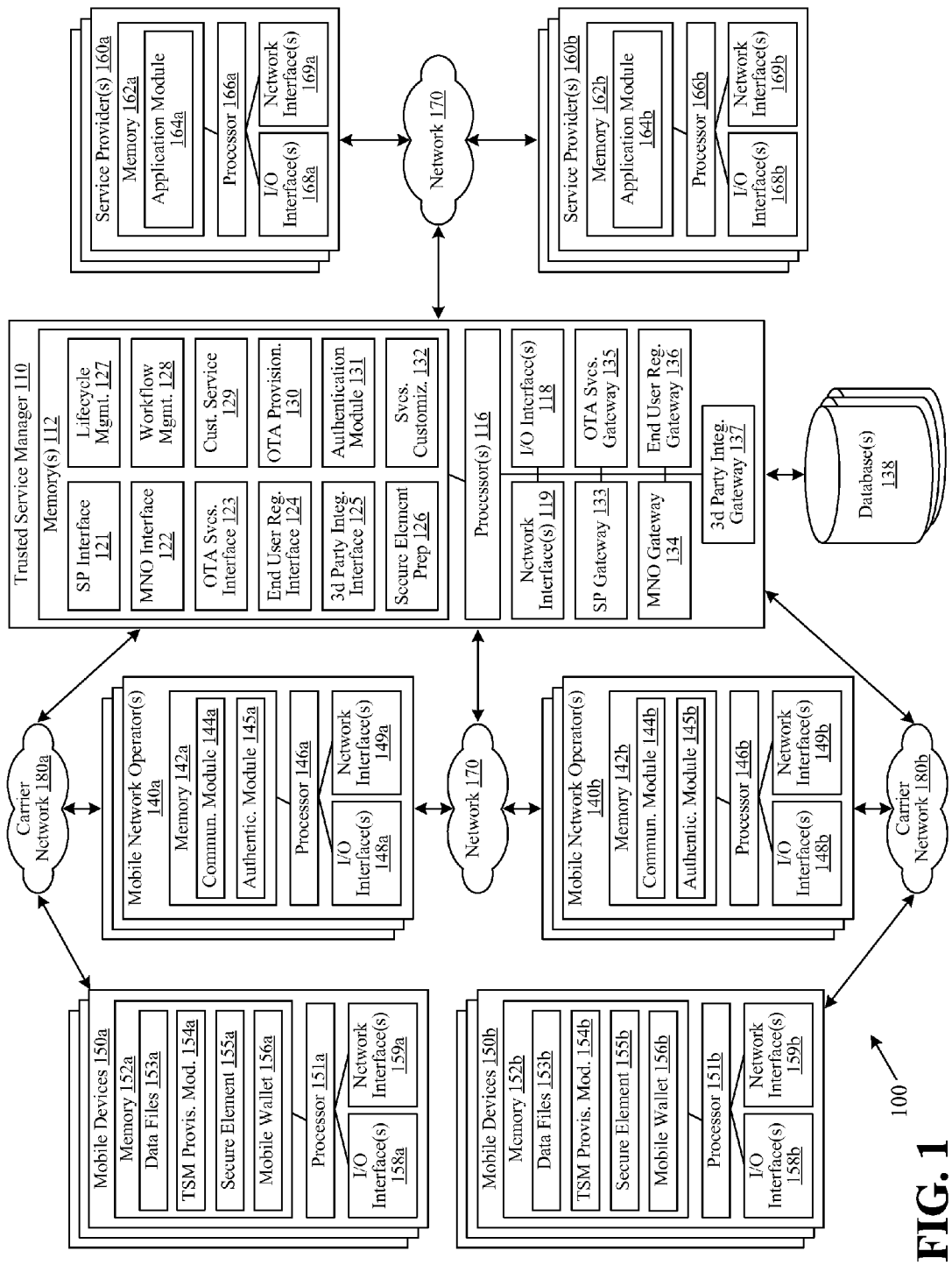
FIG. 1 illustrates a block diagram of an example trusted service management system and associated integration, according to an example embodiment of the invention.

Various embodiments of the invention are directed to authenticating mobile device communications. A mobile device communication may be a communication received from a mobile device or a communication transmitted to a mobile device. As a result of authenticating a communication, a determination may be made that the contents of the communication are relatively secure. In one example embodiment, when a communication is generated or prepared for transmission to a recipient, a payload authentication code ("PAC") may be generated for the message based at least in part upon a shared secret between the communicating device and the recipient. For example, a service provider may generate a communication for transmission to a mobile device, and the service provider may generate a PAC based at least in part upon a shared secret between the service provider and the mobile device. Similarly, a mobile device may generate a communication for transmission to a service provider, and the mobile device may generate a PAC based at least in part upon a shared secret between the mobile device and the service provider.

A wide variety of different types of shared secrets may be utilized as desired to generate a PAC in various embodiments of the invention. Examples of suitable shared secrets include, but are not limited to, user access credentials (e.g., a user name and password) or another basic authentication method, certificate-based authentication, public and private key-based authentication, dynamic passcode authentication, and/or derived unique key per transaction ("DUKPT") authentication. Once a PAC is generated, the PAC may be appended to or otherwise associated with the communication. As desired, a payload of the communication may be formatted and/or encrypted. For example, the payload may be encrypted utilizing the shared secret and/or another suitable encryption technique.

Once a communication has been generated, the communication may be transmitted by the originating device to the recipient device. In certain embodiments, the communication may be transmitted via any number of intermediary devices and/or systems, such as mobile network operator devices. The recipient device may evaluate the message to identify the originating device. Based at least in part upon the identification of the originating device, the recipient device may identify or determine the shared secret between the two devices, and the shared secret may be utilized to evaluate the PAC. For example, the recipient may utilize the shared secret to determine whether the PAC is valid. If it is determined that the PAC is not valid, then an error may be generated, and the communication may be identified as an invalid communication. As desired in certain embodiments, an application that generated the communication, such as a mobile wallet application 156, may be identified as an unauthenticated application. If, however, it is determined that the PAC is valid, then one or more payload elements of the communication may be decrypted and/or authenticated. In other words, the communication may be identified as a valid communication. As desired, an application that generated the communication, such as a mobile wallet application 156, may be identified as an authorized application.

In certain embodiments of the invention, a mobile device may be provisioned with a suitable authentication application that facilitates the generation of PACs, the verification of PACs, the encryption of outbound communications, and/or the decryption of received communications. A similar application may be executed by the service provider. As a result of evaluating and validating PACs, the authenticity of communications may be facilitated. For example, communications generated by mobile device applications provided by third party vendors (e.g., mobile wallet applications, etc.) may be validated. In this regard, potential security threats and/or risks may be identified, and the security of device communications may be enhanced.

Various embodiments of the invention utilize trusted service management functionality to facilitate integration between multiple service providers and multiple mobile devices operating on any number of carrier networks, each operated by a different mobile network operator ("MNO"). In certain embodiments, a trusted service manager ("TSM") may be a third party entity strategically positioned to provide mobile device application provisioning services and integration functionality for provisioning mobile device applications and associated end user data to end users' mobile devices, to provide mobile device application-related lifecycle management services, to manage the many-to-many relationships between the multiple service providers and the MNOs operating the carrier networks, and/or to authenticate mobile devices during the processing of a wide variety of different requests and/or transactions.

Applications that can be provisioned on mobile devices via a TSM can be any software application provided by a service provider and operable with a mobile device. According to one embodiment, near field communication ("NFC") applications that enable subsequent transactions using NFC technology of the mobile device (e.g., radio frequency identification ("RFID")) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

In addition to providing integration and mobile device application provisioning functionality, a TSM may be further operable to provide additional features and functionality associated with each application provisioned and with each service provider, MNO, and/or mobile device end user relationship. Example additional features that a TSM may provide include, but are not limited to, application lifecycle management (e.g., load, personalize, lock, unlock, terminate, etc.), secure element lifecycle management (e.g., lock, unlock, terminate, etc.), workflow management (e.g., new handset, exchanged handset, damaged handset, lost handset, stolen handset, closed MNO account, closed service provider account, etc.), secure element data preparation and application personalization, MNO customer service, service provider customer service, over the air ("OTA") provisioning, secured key management, end user authentication, MNO-based end user registration, carrier network-based end user registration, service provider-based end user registration, interactive voice response-based ("IVR-based") end user registration, live end user registration, and the like. It is appreciated that the aforementioned additional TSM features and functionality are provided for illustrative purposes only, and that any number of features and functionality may be provided by the TSM to service providers, MNOs, and/or end users in association with the application provisioning services and functionality.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 represents a block diagram of an example system 100 for providing trusted service management functionality, according to one embodiment of the invention. As shown in FIG. 1, a trusted service manager ("TSM") computer 110; multiple mobile network operator ("MNO") computers 140a, 140b; multiple mobile devices 150a, 150b; and multiple service provider computers 160a, 160b may be in communication via at least one network 170 and/or multiple carrier networks 180a, 180b, each of the carrier networks 180a, 180b being associated with a respective MNO computer 140a, 140b. Each of these components will now be discussed in further detail.

First, the TSM computer 110 may include any number of processor-driven devices, including but not limited to, a server computer, a mainframe computer, one or more networked computers, a desktop computer, a personal computer, a laptop computer, a mobile computer, or any other processor-based device. In addition to having one or more processors 116, the TSM computer 110 may further include one or more memory devices 112, input/output ("I/O") interface(s) 118, and network interface(s) 119. The memory 112 may be any computer-readable medium, coupled to the processor(s) 116, such as RAM, ROM, and/or a removable storage device for storing data files and a database management system ("DBMS") to facilitate management of data files and other data stored in the memory 112 and/or stored in one or more separate databases 138. The memory 112 may also store various program modules, such as an operating system ("OS"), a service provider interface 121, a mobile network operator interface 122, an over the air provisioning services interface 123, an end user registration interface 124, a third party integrator interface 125, a secure element preparation module 126, a lifecycle management module 127, a workflow management module 128, a customer service module 129, an over the air provisioning module 130, an authentication module 131, and a services customization module 132. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules 121, 122, 123, 124, 125, 126, 127, 128, 129, 130, 131, 132 may comprise computer-executable program instructions or software, including a dedicated program, for receiving, storing, extracting, managing, processing, and analyzing transactions associated with application provisioning, lifecycle management, and/or authentication between multiple service provider computers 160a, 160b and multiple mobile devices 150a, 150b operating on multiple carrier networks 180a, 180b, each of which are operated by a different MNO computer 140a, 140b. The specific functions and operability of each of these interfaces and modules 121, 122, 123, 124, 125, 126, 127, 128, 129, 130, 131, 132 are described in greater detail below.

Still referring to the TSM computer 110, the I/O interface(s) 118 may facilitate communication between the processor 116 and various I/O devices, such as a keyboard, mouse, printer, microphone, speaker, monitor, bar code reader/scanner, RFID reader, or Hardware Security Modules ("HSMs") which facilitate secure key management and the like. With respect to HSMs, an HSM may be external, such as connected to the TSM computer 110 via a network, or internally or proximately connected to the TSM computer 110. The network interface(s) 119 may take any of a number of forms, such as, but not limited to, a network interface card, a modem, a wireless network card, a cellular network card, or any other means operable for facilitating communications with one or more carrier networks 180a, 180b and/or other networks 170. Indeed, the TSM computer 110 can communicate directly with mobile devices 150a, 150b via the carrier networks 180a, 180b, respectively, via network interface(s) 119 and/or via one or more of a service provider gateway 133, mobile network operator gateway 134, over the air services gateway 135, end user registration gateway 136, and third party integrator gateway 137. It will be appreciated that the TSM computer 110 may be implemented on a particular machine, which may include a computer that is designed, customized, configured, or programmed to perform at least one or more functions of the interfaces and modules 121, 122, 123, 124, 125, 126, 127, 128, 129, 130, 131, 132, according to an example embodiment of the invention.

Second, the MNO computers 140a, 140b may include any number of processor-driven devices, including but not limited to, a server computer, a mainframe computer, one or more networked computers, a desktop computer, a personal computer, a laptop computer, a mobile computer, or any other processor-based device. In addition to having one or more processors 146a, 146b, each of the MNO computers 140a, 140b may further include one or more memory devices 142a, 142b, input/output ("I/O") interface(s) 148a, 148b, and network interface(s) 149a, 149b. The memory 142a, 142b may be any computer-readable medium, coupled to the processor(s) 146, such as RAM, ROM, and/or a removable storage device for storing data files and a DBMS to facilitate management of data files and other data stored in the memory 142a, 142b and/or stored in one or more separate databases. The memory 142a, 142b may also store various program modules, such as an operating system ("OS"), a communications module 144a, 144b, and an authentication module 145a, 145b. The OS may be, but is not limited to, Microsoft Windows®, Apple OSX™, Unix, a mainframe computer operating system (e.g., IBM z/OS, MVS, OS/390, etc.), or a specially designed operating system. The communications module 144a, 144b may comprise computer-executable program instructions or software, including a dedicated program, for facilitating communications with multiple mobile devices 150a, 150b operating on the respective carrier networks 180a, 180b, and for facilitating mobile device application provisioning and management via a common MNO messaging standard as implemented by the TSM computer 110. The authentication module 145a, 145b may comprise computer-executable program instructions or software, including a dedicated program, for facilitating the authentication of mobile devices 150a, 150b and/or communications, as well as the establishment of secure communications channels with mobile devices 150a, 150b. A wide variety of authentication procedures may be utilized as desired by an authentication module 145a, 145b. In certain embodiments of the invention, an MNO computer 140a, 140b may authenticate a mobile device 150a, 150b and/or a communication in a similar manner as that described below for the TSM 110.

Still referring to each MNO computer 140a, 140b, the I/O interface(s) 148a, 148b may facilitate communication between the processors 146a, 146b and various I/O devices, such as a keyboard, mouse, printer, microphone, speaker, monitor, bar code reader/scanner, RFID reader, and the like. The network interface(s) 149a, 149b may take any of a number of forms, such as, but not limited to, a network interface card, a modem, a wireless network card, a cellular network card, or any other means operable for facilitating communications with one or more carrier networks 180a, 180b and/or other network 170. It will be appreciated that the MNO computers 140a, 140b may be implemented on a particular machine, which may include a computer that is designed, customized, configured, or programmed to perform at least one or more functions of the communications module 144a, 144b, according to an example embodiment of the invention.

Third, the mobile devices 150a, 150b may be any mobile processor-driven device, such as a mobile phone, radio, pager, laptop computer, handheld computer, PDA, and the like, or any other processor-based mobile device for facilitating communications over one or more carrier networks 180a, 180b. For example, each mobile device 150a, 150b may be registered with a specific MNO computer 140a, 140b for communicating via the respective carrier network 180a, 180b. In addition to having one or more processors 151a, 151b, each of the mobile devices 150a, 150b may further include one or more memory devices 152a, 152b, input/output ("I/O") interface(s) 158a, 158b, and network interface(s) 159a, 159b. The memory 152a, 152b may be any computer-readable medium, coupled to the processor(s) 151, such as RAM, ROM, and/or a removable storage device for storing data files. The memory 152a, 152b may also include secure elements 155a, 155b for maintaining mobile device applications and confidential data offered by one or more service providers 160, as may be provisioned via the TSM computer 110 and associated provisioning services. In certain embodiments, a secure element 155a, 155b may be configured to store an authentication module or program utilized by a mobile device 150a, 150b to generate payload authentication codes ("PACs"), evaluate PACs, manage one or more shared secrets, encrypt communications output by the mobile device 150a, 150b, and/or decrypt communications received by the mobile device 150a, 150b.

The memory 152a, 152b may also store any number of data files 153a, 153b and/or various program modules, such as an operating system ("OS"), end user interface module(s), a TSM provisioning module 154a, 154b (also referred to interchangeably herein as "TSM administration software"), and/or a mobile wallet 156a, 156b. The OS may be any mobile operating system, including proprietary operating systems by a mobile device manufacturer or mobile network operator, or third party software vendor mobile operating system, such as, but not limited to, Microsoft Windows CE®, Microsoft Windows Mobile®, Symbian OS™, Apple iPhone™ OS, RIM BlackBerry® OS, Palm OS® by ACCESS, or Google Android™. The mobile wallet 156a, 156b may be any suitable application that facilitates mobile payment and/or other the completion of other mobile transactions utilizing the mobile device 150a, 150b. The TSM provisioning module 154a, 154b may comprise computer-executable program instructions or software, including a dedicated program, for facilitating mobile device application provisioning on general memory and/or on the secure elements 155a, 155b as carried out by the TSM computer 110. According to various embodiments, the secure elements 155a, 155b may refer to any computer-readable storage in the memory 152 and/or may refer to any securitized medium having memory, such as a Universal Integrated Circuit Card ("UICC"), Subscriber Identity Module ("SIM"), and the like. In one example, the secure elements 155a, 155b may be operable with a RFID device or other NFC device associated with the mobile devices 150a, 150b. It is also appreciated that the secure elements 155a, 155b may be a separate embedded secure element (e.g., smart card chip) or a separate element (e.g., removable memory card, a key fob; connected via Bluetooth, etc.). For example, a secure element chip may be embedded in a mobile device 150a, 150b separately from a general operation chip utilized by the mobile device 150a, 150b. In certain embodiments, the secure elements 155a, 155b may include any suitable hardware and/or software, such as memory, processing components, and communications components. In certain embodiments, the secure elements 155a, 155b may be configured to communicate with other elements of the mobile devices 150a, 150b, such as a general or shared memory chip associated with the mobile devices 150a, 150b. For example, a mobile wallet 156a, 156b may be stored in shared memory, and a secure element 155a, 155b may be accessed to process PACs and/or to encrypt and/or decrypt transactions generated by and/or received by the mobile wallet 156a, 156b.

Still referring to each mobile device 150a, 150b, the I/O interface(s) 158a, 158b may facilitate communication between the processors 151a, 151b and various I/O devices, such as a keypad, touch screen, keyboard, mouse, printer, microphone, speaker, screen display, RFID device, NFC device, and the like. The network interface(s) 159a, 159b may take any of a number of forms to permit wireless communications according to various communications standards, such as, but not limited to, Code Division Multiple Access ("CDMA"), Global System for Mobile Communication ("GSM"), Universal Wireless Communications ("UWC"), Universal Mobile Telecommunications System ("UMTS"), or General Packet Radio Service ("GPRS") communication standards as may be implemented by one or more carrier networks 180a, 180b. The network interfaces(s) 159a, 159b may further permit access to other networks 170, such as via one or more carrier networks 180a, 180b providing Internet or other network access, or via Wi-Fi communications onto a Wi-Fi network. It will be appreciated that the mobile devices 150a, 150b may be implemented on a particular machine, which may include a computer that is designed, customized, configured, or programmed to perform at least one or more functions of the TSM provisioning module 154a, 154b and other mobile communications, including voice communications, data communications, short message service ("SMS"), wireless application protocol ("WAP"), multimedia message service ("MMS"), Internet communications, other wireless communications, and the like, according to an example embodiment of the invention.

Fourth, the service provider ("SP") computers 160a, 160b may include any number of processor-driven devices, including but not limited to, a server computer, a mainframe computer, one or more networked computers, a desktop computer, a personal computer, a laptop computer, a mobile computer, or any other processor-based device. In addition to having one or more processors 166a, 166b, each of the service provider computers 160a, 160b may further include one or more memory devices 162a, 162b, input/output ("I/O") interface(s) 168a, 168b, and network interface(s) 169a, 169b. The memory 162a, 162b may be any computer-readable medium, coupled to the processor(s) 166, such as RAM, ROM, and/or a removable storage device for storing data files and a DBMS to facilitate management of data files and other data stored in the memory 162a, 162b and/or stored in one or more separate databases. The memory 162a, 162b may also store various program modules, such as an operating system ("OS") and a mobile device application module 164a, 164b. The OS may be, but is not limited to, Microsoft Windows®, Apple OSX™, Unix, a mainframe computer operating system (e.g., IBM z/OS, MVS, OS/390, etc.), or a specially designed operating system. The mobile device application module 164a, 164b may comprise computer-executable program instructions or software, including a dedicated program, for generating and/or providing mobile device software applications for provisioning on multiple mobile devices 150a, 150b via a common service provider messaging standard as implemented by the TSM computer 110.

Still referring to each service provider computer 160a, 160b, the I/O interface(s) 168a, 168b may facilitate communication between the processors 166a, 166b and various I/O devices, such as a keyboard, mouse, printer, microphone, speaker, monitor, bar code reader/scanner, RFID reader, and the like. The network interface(s) 169a, 169b may take any of a number of forms, such as, but not limited to, a network interface card, a modem, a wireless network card, a cellular network card, or any other means operable for facilitating communications with the network 170. It will be appreciated that the service provider computer 160a, 160b may be implemented on a particular machine, which may include a computer that is designed, customized, configured, or programmed to perform at least one or more functions of the mobile device application module 164a, 164b, according to an example embodiment of the invention.

The network 170 may include any telecommunication and/or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. The network 170 may also allow for real time, near real time, off-line, and/or batch transactions to be transmitted between or among the TSM computer 110, the MNO computer(s) 140a, 140b, the mobile devices 150a, 150b, and the service provider computers 160a, 160b. Due to network connectivity, various methodologies as described herein may be practiced in the context of distributed computing environments. It will also be appreciated that the network 170 may include a plurality of networks, each with devices such as gateways and routers for providing connectivity between or among networks 170. Instead of, or in addition to, a network 170, dedicated communication links may be used to connect the various devices in accordance with an example embodiment.

The mobile carrier networks 180a, 180b may include any cellular telecommunication network, each operated by a respective mobile network operator. The mobile carrier networks may be implemented to operate according to one or more wireless technology formats, including, but not limited to, CDMA, GSM, UWC, UMTS, GPRS, and/or any "generation" or version thereof. Accordingly, in one embodiment, each mobile device 150a, 150b is configured to operate primarily on a certain carrier network 180a, 180b as operated by the mobile network operator with which the mobile device end user has an agreement and with which the mobile device is registered. It is appreciated, however, that, according to various embodiments, mobile devices 150a, 150b and carrier networks 180a, 180b may be configured to permit interoperability of mobile devices on non-registered carrier networks 180a, 180b.

Generally, each of the memories and data storage devices, such as the memories 112, 142a, 142b, 152a, 152b, 162a, 162b and the databases 138, and/or any other memory and data storage device, can store data and information for subsequent retrieval. In this manner, the system 100 can store various received or collected information in memory or a database associated with one or more of the TSM computer(s) 110, the MNO computer(s) 140a, 140b, the mobile devices 150a, 150b, and/or the service provider computer(s) 160a, 160b. The memories and databases can be in communication with each other and/or other databases, such as a centralized database, or other types of data storage devices. When needed, data or information stored in a memory or a database may be transmitted to a centralized database capable of receiving data, information, or data records from more than one database or other data storage devices. In other embodiments, the databases shown can be integrated or distributed into any number of databases or other data storage devices.

Suitable processors, such as the processors 116, 146a, 146b, 151a, 151b, 166a, 166b, may comprise a microprocessor, an application-specific integrated circuit ("ASIC"), and/or state machine. Example processors can be those provided by Intel Corporation (Santa Clara, Calif.), AMD Corporation (Sunnyvale, Calif.), and Motorola Corporation (Schaumburg, Ill.). According to various embodiments, one or more of the computers can be configured as a multi-processor computer having multiple processors 116, 146a, 146b, 151a, 151b, 166a, 166b providing parallel and/or redundant processing capabilities. Such processors comprise, or may be in communication with, media, for example, computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, EPROM, EEPROM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language, including but not limited to, assembly, C, C++, C#, Visual Basic, Java, Python, Perl, JavaScript, GPSS, LISP, SAS, Parlay, JAIN, or Open Mobile Architecture.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. In addition, the designation of system components by "a" and "b" is not intended to limit the number of possible components, but instead are provided for illustrative purposes to indicate that more than one of the respective components can be provided. Accordingly, embodiments of the invention should not be construed as being limited to any particular operating environment, system architecture, or device configuration.

Figure 2:
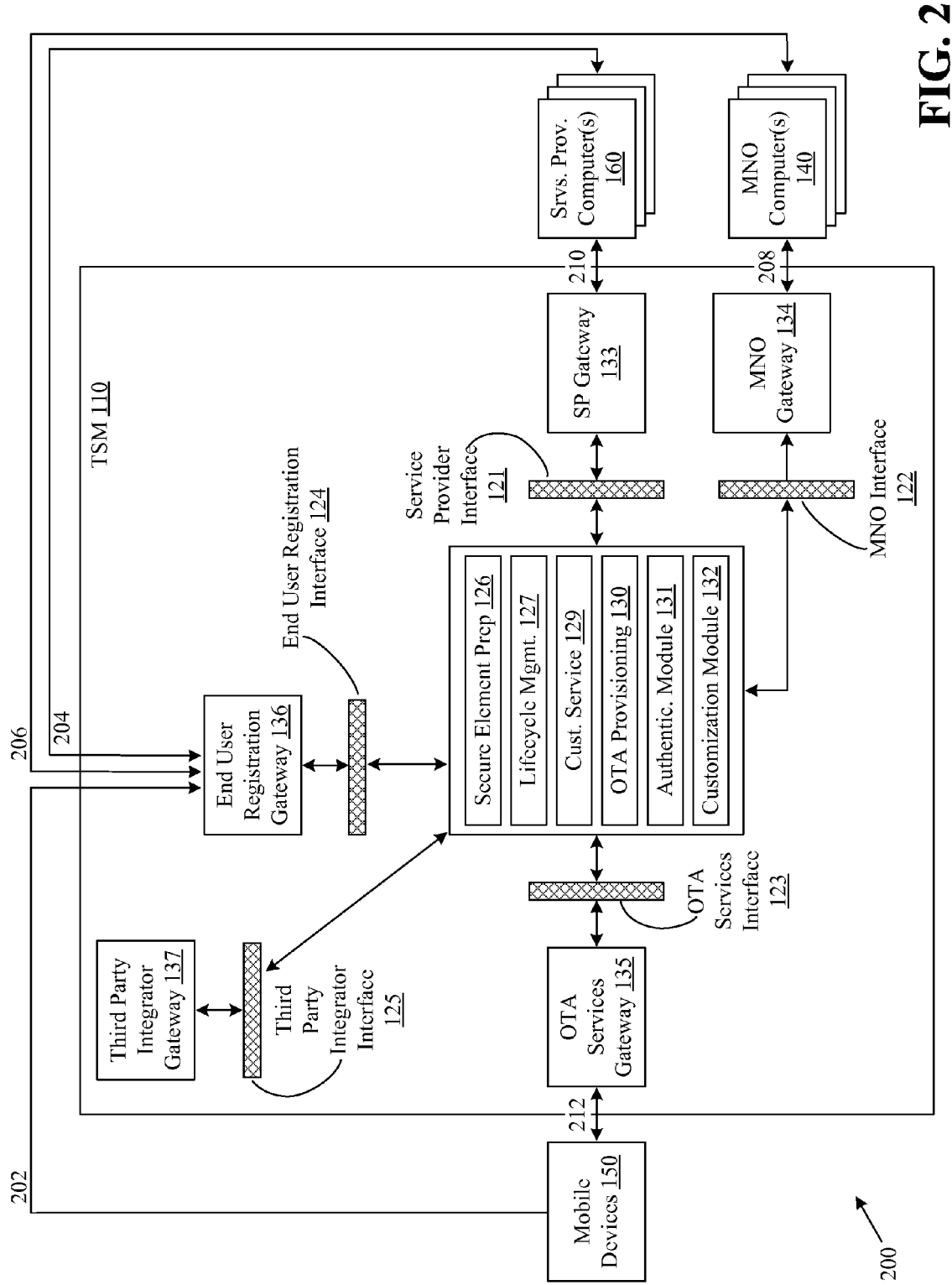
FIG. 2 illustrates a block diagram of an example trusted service management integration and associated data flow, according to an example embodiment of the invention.

FIG. 2 illustrates an example block diagram 200 illustrating data flow and integration points between the TSM computer 110 and the various other entities that may participate in mobile device application provisioning, integration, authentication, and maintenance, such as multiple service provider computers 160, multiple MNO computers 140, and multiple mobile devices 150, according to one embodiment of the invention. An example operation of the block diagram 200 of FIG. 2 will be described separately and in conjunction with the flow diagrams of FIGS. 3-6.

As generally described above, a TSM and associated TSM computer 110 may be operable to load, delete, and manage mobile device applications and associated end user data on mobile devices on behalf of multiple service providers. Additionally, the TSM computer 110 may be operable to facilitate the authentication of mobile devices and/or mobile device communications. According to various embodiments, the TSM computer 110 may be operable to provide, but is not limited to, one or more of the following functions: to act as a single point of integration between service providers, MNOs, and other TSMs; to load mobile device applications over the air to mobile devices; to accept, prepare and personalize mobile device application end user data; to allow service providers to interact with end users over one or more of the carrier networks for registration and communications; to enable a service provider to authenticate the end user requesting personalization of an application; to manage secured keys (e.g., cryptographic keys, master keys, rotated keys, private keys, transaction specific keys, etc.) used for application provisioning, personalization, and/or authentication of mobile devices; to manage shared secrets for message authentication; to generate and/or validate PACs; to manage mobile device application lifecycles on behalf of service providers over the life of an application; to manage mobile device lifecycles on behalf of MNOs over the life of a handset; and to provide billing and other administration functions to support relationships between MNOs and service providers, and between the TSM and each MNO and service provider.

Various services provided by the TSM computer 110 can be implemented by one or more of the following application modules: the secure element preparation module 126, the lifecycle management module 127, the workflow management module 128, the customer service module 129, the over the air provisioning module 130, the authentication module 131, and the services customization module 132.

The secure element preparation module 126 may be configured to facilitate preparing mobile device secure elements, such as requesting increased space allocated on the secure element for provisioning applications and verifying secure element properties with the MNO. According to various embodiments, the secure element preparation module 126 may further be configured to receive and/or provide personalization data associated with mobile device applications for each end user during provisioning. In one example, a service provider computer 160 may provide personalization data via the service provider gateway 133. As another example, the TSM computer 110 may generate personalization data via the secure element preparation module 126. As yet another example, the TSM computer 110 may coordinate application personalization and/or secure element preparation via one or more third entities.

The lifecycle management module 127 may be configured to facilitate tracking the status of users' mobile devices and the status of previously provisioned applications. For example, the lifecycle management module 127 may be configured to maintain inventories of various types of mobile devices, associated secure elements and the state of the secure elements and applications (active, locked, unlocked, terminated), which may be used to track the status of applications and mobile devices, and to communicate with MNOs and/or service providers regarding the provisioned applications, the mobile devices, the end user, etc. In addition, the lifecycle management module 127 may be configured to coordinate initial application requests, application personalization, secure element preparation, and provisioning; coordinate any third party entities participating in the provisioning process; maintain statuses; and facilitate billing and payment (e.g., MNO fees, service provider payments, etc.).

The workflow management module 128 may be configured to maintain and manage the workflow of events between MNOs and service providers. For example, when the MNO reports a lost or stolen handset to the TSM, the TSM may trigger a series of events to the service providers to prevent fraudulent transactions. In turn, the workflow management module 128, based on service provider rules, may instruct the lifecycle management module to send one or more commands to the mobile device to lock or terminate applications.

The customer service module 129 may be configured to receive and respond to customer service requests, including those from end users, service providers, and/or MNOs. According to one embodiment, the TSM computer 110 and associated customer service module 129 may provide triage and management functions between the various responsible entities (e.g., service providers and MNOs), and/or provide initial or more involved levels of customer service.

The over the air provisioning module 130 may be configured to facilitate the OTA provisioning of mobile device applications and associated end user data with multiple mobile devices. As described in more detail herein, the OTA provisioning module 130 may facilitate communications with third party OTA provisioning providers via the OTA services gateway 135, and/or can facilitate direct provisioning by the TSM computer 110. It is appreciated that, according to some embodiments, the functions of the OTA provisioning module 130 may also be implemented in one or more of the MNO computers 140 and/or within functions implemented by the carrier networks 180a, 180b, either instead of, or in combination with, those provided in the TSM computer via the OTA provisioning module 130.

The authentication module 131 may be configured to provide administration and maintenance functions for shared secrets and/or secured keys (e.g., cryptographic keys, master keys, public keys, private keys, etc.) in accordance with TSM security policies, MNO security policies, and/or service provider security policies. Additionally, the authentication module 131 may be configured to utilize PACs to process both outgoing and received communications. Various functions performed by the TSM computer 110 may integrate with the authentication module 131 to provide security for end users, MNOs, and service providers in association with each of the TSM services.

According to an aspect of the invention, the authentication module 131 may be configured to process an outbound communication in order to add a PAC to the communication. In this regard, the communication may be received and validated by a recipient mobile device 150a, 150b. In doing so, the authentication module 131 may identify a recipient mobile device 150a, 150b and determine a shared secret between the TSM computer 110 and the recipient mobile device 150a, 150b. A wide variety of shared secrets may be utilized as desired in various embodiments of the invention, such as basic authentication, key-based authentication, dynamic passcode authentication, certificate-based authentication, and/or DUKPT authentication. Once a shared secret has been identified, the shared secret may be utilized to generate or derive a PAC, and the PAC may be appended or otherwise added to the communication. As desired, one or more payload elements of the communication may be formatted and/or encrypted by the authentication module 131. The communication may then be output for transmission to the recipient mobile device 150a, 150b, and the mobile device 150a, 150b may evaluate the PAC in order to determine whether the communication is valid or authenticated.

In a similar manner, the authentication module 131 may process a communication received from a mobile device 150a, 150b. For example, a mobile device 150a, 150b from which the communication originated may be identified by suitable identifying information associated with the communication (e.g., a device identifier, a telephone number, an Internet Protocol address, etc.). Based upon the identification of the mobile device 150*a*, 150*b*, a shared secret between the TSM computer 110 and the mobile device 150*a*, 150*b* may be identified or determined, and the shared secret may be utilized to evaluate a PAC associated with the received communication. In this regard, a determination may be made as to whether the PAC is valid or authenticated. If the PAC is determined to be valid, then the communication may be authenticated, and one or more payload components may be decrypted and/or processed. Otherwise, the communication may be identified as a suspicious communication, and any number of suitable errors and/or exceptions may be generated.

One example of the operations that may be performed by the authentication module 131 is described in greater detail below with reference to FIG. 4. Additionally, an authentication application or authentication module installed on a mobile device 150*a*, 150*b* may operate in a similar manner as the authentication module 131 described for the TSM computer 110.

The services customization module 132 may be configured to facilitate customization and selection of services offered by the TSM to each service provider and MNO. As is apparent by that described and illustrated herein, the TSM computer 110 may be configured to provide a variety of features and functions associated with mobile device application provisioning and integration between the service providers and MNOs. Accordingly, due at least in part to the simplified common interfaces and gateways (e.g., MNO gateway 134 and MNO interface 122, service provider gateway 133 and service provider interface 121, etc.), the TSM computer 110 may permit each service provider and MNO to customize from the services available. The services customization module 132 may be configured to include computer-executable program logic to generate an interface for selecting and customizing TSM services, and to coordinate the implementation by other TSM application modules. For example, a first service provider may opt to only provide mobile device applications to mobile devices operating on certain carrier networks, while a second service provider may opt to provide mobile device applications to all mobile devices irrespective of the associated carrier networks. As another example, a service provider may request the TSM computer 110 to provide end user registration functionality on behalf of the service provider, while a second service provider provides its own registration services and integrates via the end user registration gateway 136 and associated end user registration interface 124. Accordingly, the customization module may permit coordinating and implementing the appropriate combination of features and integration points as requested by service providers and MNOs. It is appreciated that any combination of features and integration points may be provided by the TSM computer 110, and that these are provided for illustrative purposes only. In one implementation, the customizations provided may be driven at least in part by contractual relationships between the TSM and respective service providers and MNOs, such that the TSM may also support and/or enforce these contractual agreements as part of the features of the services customization module 132.

The MNOs and associated MNO computers 140 may be operable to provide the communications channel to reach and provision mobile device applications and associated end user data on end users' mobile devices. According to various embodiments, each MNO computer 140 may be operable to provide, but is not limited to, one or more of the following functions: provide the TSM computer with information on mobile device secure elements and unique mobile device identity modules (e.g., Universal Subscriber Identity Modules ("USIMs")) throughout the lifecycle; provide a communications gateway via a respective carrier network for OTA provisioning of mobile device applications; provide a mobile device user interface for accessing provisioned mobile device applications on each mobile device (e.g., a mobile wallet); facilitate management of secured keys used to securely load and delete mobile device applications on mobile device secure elements; interface with the TSM computer; facilitate authentication of the end user interfacing with the TSM; facilitate allocating memory for mobile device applications on the end users' mobile devices; communicate to the TSM computer that unique end user identity modules have changed; communicate to the TSM computer the status of unique mobile device identity modules (e.g., which USIMs have been lost, stolen, damaged, replaced by new mobile devices, etc.); and facilitate management of any tariffs and fees associated with application provisioning communications.

An MNO gateway 134 and associated MNO interface 122 are operable for providing a common point of integration between the TSM computer 110 and the multiple MNO computers 140. According to one embodiment, the MNO interface 122 is configured to communicate with each MNO according to the same common MNO message standard, as described further herein. Moreover, according to various embodiments, the MNO gateway 134 and associated MNO interface 122 are further operable to permit the TSM computer 110 to communicate with mobile devices 150 via a respective carrier network operated by each MNO.

The service providers and associated service provider computers 160 are operable to provide one or more services in which mobile device end users participate (e.g., financial services, membership services, loyalty account services, etc.). Accordingly, the service providers represent the entities that generate and/or provide mobile device applications associated with these services that are provisioned via the TSM computer 110 on end users' mobile devices. A service provider generating and providing the mobile device applications may be the same service provider that operates the underlying service, or may be a service provider providing the mobile device applications on behalf of another service provider operating the underlying service. According to various embodiments, each service provider computer 160 may be operable to provide, but is not limited to, one or more of the following functions: supply a mobile device application for loading onto the mobile devices of its end users (e.g., customers of the service provider); request the use of and/or provisioning of TSM-created soft-card applications (e.g., electronic application permitting payment or other features that can be used in association with participating service provider transactions); facilitate end user authentication processes and associated information; facilitate the creation and maintenance of end user application accounts (e.g., financial account if the service provider is a financial institution or payment processor, membership or loyalty account if the service provider is a retailer or other merchant, etc.); provide end user support for their provisioned mobile device applications; receive application messages from mobile devices returned via one or more of the carrier networks; facilitate processing contactless transactions associated with the provisioned mobile device applications (e.g., a payment transaction at a retailer, etc.); facilitate management and maintenance of application-related secured keys and share these keys with the TSM computer; and facilitate mobile device application personalization and/or coordinate with TSM to prepare personalization data.

A service provider gateway 133 and associated service provider interface 121 are operable for providing a common point of integration between the TSM computer 110 and the multiple service provider computers 160. According to one embodiment, the service provider interface 121 is configured to communicate with each service provider according to the same common service provider messaging standard, as described further herein.

The mobile devices 150 represent the respective end users that have contractual relationships with the MNOs (e.g., for operating on a respective carrier network) and with the service providers (e.g., for participating in one or more services offered by the service providers). Accordingly, end users may utilize the mobile devices 150 to register for, request, and activate mobile device applications from service providers via the TSM computer 110. According to various embodiments, each mobile device 150 may be operable to provide, but is not limited to, one or more of the following functions: activate mobile devices and/or secure elements with an MNO; register for and request mobile device applications from a service provider (or agent of the service provider) or from an MNO; download mobile device applications and associated end user data on mobile device secure elements; authenticate the respective end user and/or mobile device to the service provider to permit application personalization; activate applications with the respective service providers; generate PACs for association with output communications; evaluate and/or validate received communications; perform transactions using the provisioned mobile device applications (e.g., a payment transaction at a retailer, etc.); initiate customer service requests (e.g., with the respective MNO, with service providers, with the TSM, with other third party entities, etc.); notify the respective MNO of a new mobile device and/or secure element; and alter end user settings associated with provisioned mobile device applications (e.g., change or reset a PIN, cancel a mobile device application, cancel an MNO relationship, etc.).

An OTA services gateway 135 and associated OTA services interface 123 are operable to facilitate provisioning of mobile device applications and associated end user data to end users' mobile devices 150. According to one embodiment, the OTA services gateway 135 may be configured to permit the TSM computer 110 to transact with third party OTA provisioning providers to perform all or some of the OTA provisioning services with mobile devices 150, such as by utilizing a common provisioning messaging standard for all third party OTA provisioning providers in a manner similar to that described with reference to the MNO interface 122 and service provider interface 121. According to another embodiment, the OTA services gateway 135 may be configured to permit the TSM computer 110 to provision mobile device applications and associated end user data directly to the mobile devices 150, such as via one or more carrier networks. According to various embodiments, the MNO gateway 134 and associated MNO interface 122 may be utilized at least in part to provide OTA provisioning by the TSM computer 110, such as for accessing and communicating over a respective MNO carrier network.

An end user registration gateway 136 and associated end user registration interface 124 are operable to facilitate communications with mobile device end users for registering to receive mobile device applications, requesting mobile device applications, updating status on mobile devices 150 and/or provisioned applications, and the like. According to one embodiment, service provider computers 160 and/or MNO computers 140 provide registration applications for end users (e.g., mobile device-based registration interface, Internet-based registration interface, etc.). Thus, the end user registration gateway 136 and associated end user registration interface 124 provide a common integration point and associated common messaging standard for receiving and responding to such requests in a manner similar to that described with reference to the MNO interface 122 and service provider interface 121. According to another embodiment, the TSM computer 110 may be configured to provide similar registration services to mobile device end users, such as may be performed on behalf of the service providers or MNOs. According to various embodiments, the MNO gateway 134 and associated MNO interface 122 may be utilized at least in part to provide end user registration functions by the TSM computer 110, such as for transmitting and receiving registration data over a respective MNO carrier network. According to various embodiments, the service provider gateway 133 and associated service provider interface 121 may be utilized at least in part to provide end user registration functions by the TSM computer 110, such as for end user authentication.

A third party integrator gateway 137 and associated third party integrator interface 125 are operable to facilitate communications with one or more third party integrators, such as may occur when sharing responsibilities or otherwise communicating with other TSMs. Much like that described with reference to the MNO interface 122, MNO gateway 134, service provider interface 121, and service provider gateway 133, the third party integrator gateway 137 and associated third party integrator interface 125 provide a common integration point and associated common messaging standard for communicating with any third party integrators.

Figure 3:
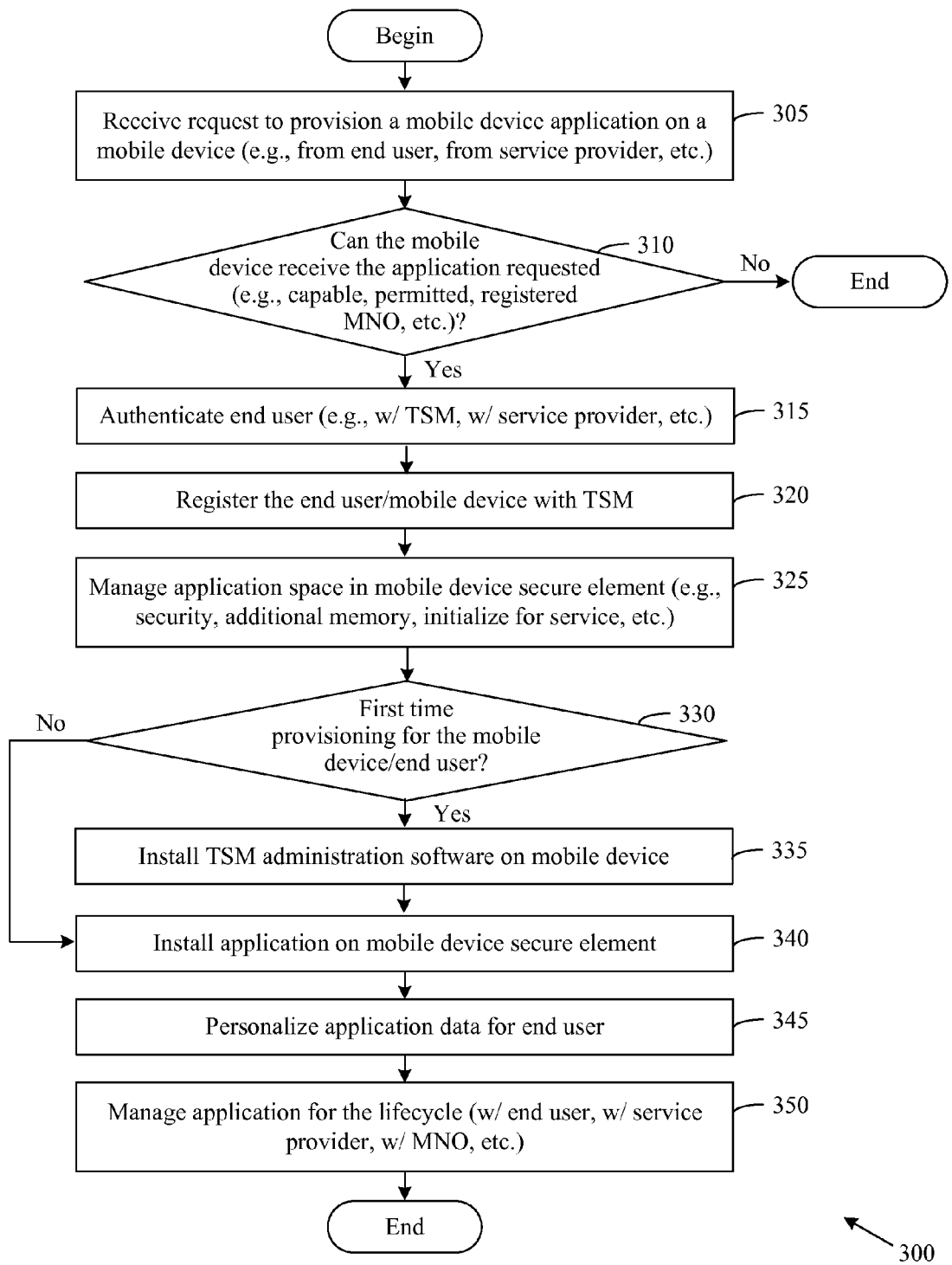
FIG. 3 illustrates a flow diagram of an example process for provisioning a mobile device application, according to an example embodiment of the invention.

With reference to FIG. 3, a flow diagram is provided illustrating an example method 300 for providing a mobile device application by a TSM computer 110, according to one embodiment. The method 300 is described also with reference to the block diagram 200 of FIG. 2.

By example only, the steps illustrated and described with reference to FIG. 3 can be performed to facilitate the provisioning of any mobile device application, such as an application that facilitates the generation and/or evaluation of PACs and/or a near field communication ("NFC") payment application provided by a payment service provider (e.g., card account issuer, financial institution, etc.). A mobile device user would request the installation of a desired application on an associated mobile device from either the TSM or directly from a service provider providing the NFC payment application. The request ultimately would be transmitted to the TSM, such as via the end user registration gateway 136 and end user registration interface 124 if coming directly from the end user, or via the service provider gateway 133 and the service provider interface 121 if coming via a service provider. Upon receiving the request, the TSM computer then may verify whether the end user's mobile device is capable of receiving installs, whether a secure element associated with the end user's mobile device is adequately configured (e.g., can support an install, sufficient space, etc.). The TSM computer may then perform the necessary steps to prepare the end user's mobile device and associated secure element, either directly and/or via the end user's mobile network operator. In addition, the TSM may perform the various authentication measures to verify the end user, the end user's mobile device, and set up and personalize the requested application for installation on the end user's secure element. After the requested application is personalized and authentication and security measures are in place at the TSM computer, the application may be provisioned to the end user's mobile device, such as via the OTA services gateway 135 and the OTA services interface 123 and/or via the MNO gateway 134 and the MNO interface 122 for interfacing with the end user's mobile network operator. After provisioning, the lifecycle of the application for that end user may be managed via the TSM computer, such as via the lifecycle management application 127. Various services can be provided and/or otherwise facilitated by the TSM computer, such as handling service requests from the end user, the MNO, and the service provider; coordinating billing between the MNO and the service provider; facilitating updates to the application; and any other communications that may be required between the MNO, the service provider, the end user's mobile device, and/or the end user. It is appreciated that this description of provisioning and servicing an application is provided for illustrative purposes, and the methods described with reference to FIG. 3 may be performed for any type of mobile device application between any of a number of parties.

The method 300 may begin at block 305, in which the TSM computer receives a request to provision a mobile device application on a mobile device. According to various embodiments, a provisioning request may come from any of the mobile devices 150 or associated end users, service provider computers 160, MNO computers 140, or associated websites or other network-routed requests. For example, a mobile device end user may transmit a registration request for a certain mobile device application as part of an end user communication 202, whereby the request is received via the end user registration gateway 136. In another example, a service provider registration request 204 is transmitted from a service provider to the end user registration gateway 136 according to a common service provider messaging standard, such as may occur when an end user requests an application via a service provider or when a new application version of a previously provisioned application is available. In yet another example, an MNO registration request 206 is transmitted from the MNO computer 140 to the end user registration gateway 136 according to a common MNO messaging standard, such as may occur if an MNO provides application registration and requests features on behalf of one or more service providers.

Following block 305, operations may continue at block 310. At decision block 310, a determination may be made as to whether the mobile device 150 is capable and/or is permitted to receive an OTA provisioned application. For example, it may be determined whether the mobile device is technically capable of receiving an OTA provisioned application or capable of operating the specific application requested, whether enough memory is available, etc., which may be obtained from the MNO computer 140 via the MNO gateway 134 utilizing MNO communications 208. In another example, it may be determined whether the mobile device and end user are permitted to receive the application requested, such as whether the end user's contract with the MNO or the service provider permits installation and/or use of the application, which may be obtained from the MNO computer 140 by MNO communications 208 sent via the MNO gateway 134 or from the service provider computer 160 by service provider communications 210 sent via the service provider gateway 133, respectively. It is appreciated that any other factor may be considered when determining whether the mobile device can receive the application at decision block 310, as may be desired.

If it is determined at block 310 that the mobile device cannot receive the mobile device application requested, then the method 300 may end. According to various embodiments, the TSM computer 110 may be configured to transmit a failure or status update to the mobile device, end user, MNO, service provider, and/or any other entity or individual. If, however, it is determined at block 310 that the mobile device may receive the mobile device application requested, then operations may continue at block 315.

At block 315, the TSM computer 110 may perform authentication processing of the end user and/or the end user's mobile device. For example, the identity of the mobile device end user may be verified as the correct end user for receiving the mobile device application and/or associated personalization data, and/or that the mobile device is in the correct end user's possession. According to one embodiment, the TSM computer 110 is operable to at least partially perform end user authentication, such as by receiving end user authentication data as part of an end user communication 202 and processing the end user authentication data against service provider provided authentication data and/or TSM stored authentication data. However, according to other embodiments, the respective service provider can authenticate customers directly via the service provider computer 160. According to yet another embodiment, a combination of the TSM computer 110 and the service provider computer 160 may perform end user authentication, such as by receiving authentication data as part of the end user communication data 202 directly via the end user registration gateway 136, processing the authentication data in part by the TSM computer 110, and communicating authentication data and responses with the service provider computer 160 by the service provider communications 210 sent via the service provider gateway 133, according to the common service provider messaging standard. If it is determined that the end user is not authenticated, then the method 300 may terminate, or may re-attempt authentication.

If the end user is authenticated at block 315, then block 320 follows. At block 320, the end user and/or the mobile device is registered with the TSM, because it was previously determined at block 310 that the mobile device and/or the user has not yet received an application via the TSM. According to various embodiments, as part of the registration process, the TSM computer 110 may be configured to store unique identifiers of the mobile device, its secure element, and/or the end users for subsequent processing. For example, according to one embodiment, the TSM computer 110 may store a Mobile Subscriber Integrated Services Digital Network Number ("MSISDN"), Integrated Circuit Card ID ("ICCID"), an International Mobile Subscriber Identity ("IMSI"), and/or card production life cycle ("CPLC") information to uniquely identify the end user and associated mobile device. According to other embodiments, however, any unique identifier may be used, such as may be provided by the end user or by the MNO.

Following block 320 is block 325, in which the TSM computer 110 facilitates the management of the application space on the mobile device secure element or other memory device associated with the mobile device. As part of this process, additional space may be provisioned via the MNO, secured keys may be provided (e.g., by the TSM or by the MNO), privileges associated with the secure element (or other memory device) may be added or changed, and/or the mobile device may be initialized for utilizing the mobile device application (e.g., initialized for NFC transactions, etc.). It is appreciated that various other steps may be performed as part of preparing the secure element for provisioning the requested application. According to various embodiments, some or all of these steps are initiated by the TSM computer 110 but performed at least in part by an MNO computer 140 communicating directly with the mobile device (e.g., via wireless communications over the respective carrier network, via Internet-based communications, etc.). Though, according to other embodiments, the TSM computer 110 and the associated secure element preparation module 126 and/or OTA provisioning module 130 are operable to facilitate preparing and managing the application space on the mobile device secure element at block 325 via OTA communications 212 from the TSM computer 110 to the mobile device 150 via the OTA services gateway 135 (which, according to various embodiments, may also utilize the MNO gateway 134).

Following block 325 is decision block 330, in which a determination may be made as to whether the mobile device and/or end user associated with the mobile device has previously received a mobile device application via the TSM computer 110. If the TSM computer 110 has previously provisioned an application on the mobile device, then it may be assumed that the end user and/or mobile device is registered with the TSM, has TSM administration software installed, and is capable of OTA application installations. However, if the mobile device has not yet participated in OTA provisioning via the TSM computer, then additional steps may be performed to validate the capabilities and permissions to receive the application. If it is determined at block 330 that the mobile device and/or the end user has previously received a mobile device application via the TSM computer, then operations may continue at block 340 described below.

If, however, it is determined at block 330 that the mobile device and/or the end user has not previously received a mobile device application via the TSM computer, then operations may continue at block 335, and the TSM computer 110 may install TSM administration software on the mobile device 150 that may be utilized to provide secured access to secure elements and further facilitate installing, accessing, and operating TSM-provisioned applications. The TSM computer 110 may install the TSM administration software on the mobile device also by OTA communications 212 sent via the OTA services gateway 135. It is appreciated that, according to another embodiment, a third party OTA provisioning provider may perform some or all of the application installation functions. In another embodiment, the MNO may generate and/or provide TSM administration software capable of accessing and operating TSM-provisioned applications. In one embodiment, the TSM administration software may be utilized to install, access, and operate all mobile device applications provided by all service providers. Though, in another embodiment, multiple administration software applications may be required, such as may occur when certain service provider applications require specialized administration software.

Following block 335 is block 340, in which the requested application may be installed on the secure element (or other memory device) of the mobile device 150. According to one embodiment, the requested application is installed by the TSM computer 110 by communicating directly with the mobile device via the OTA services interface 123 by transmitting application data in the OTA messaging according to the standard required by the specific secure element, mobile device, and/or carrier network technology, such as via Wireless Application Protocol ("WAP"), Short Messaging Service ("SMS"), Multimedia Messaging Service ("MMS"), etc. It is appreciated that, while each of the gateways and associated interfaces described herein are designed to promote a common integration point and common messaging standards to simplify integration and system flexibility, various mobile devices and carrier networks may operate according to a number of wireless technologies, each of which may cause application provisioning processing to be performed differently according to each of the various wireless network technologies. According to another embodiment, however, instead of the TSM computer 110 provisioning the requested application, a third party OTA provisioning provider may perform some or all of the application installation functions. According to this embodiment, the OTA services gateway 135 and associated OTA services interface 123 can be configured to implement a common provisioning messaging standard for communicating with each of the possible third party OTA provisioning providers.

Following block 340 is block 345, in which personalization data associated with the requested mobile device application may be prepared and transmitted to the mobile device. According to one embodiment, personalization data may be generated by the TSM computer 110 from data supplied by the service provider computer 160 via service provider communications 210 in the common service provider messaging format. According to other embodiments, personalization data may be created by the TSM computer 110 based on stored data, or created by a third party entity for providing personalization data. The format and content of personalization data can vary, depending on the mobile device application to be provisioned. Moreover, it is further appreciated that, according to another embodiment, the personalization application data or other associated end user data can be transmitted at or near the same time as the application is provisioned on the mobile device at block 340.

Following block 345 is block 350, in which the TSM computer 110 is operable to manage the provisioned application during its lifetime as installed on the secure element associated with the mobile device 150. For example, as an application is installed at block 340, the TSM computer 110 may be operable to record application installation status, including successes and failures, as may be provided by the lifecycle management module 127. The TSM computer 110 and associated lifecycle management module 127 may thus be configured to track statuses associated with the provisioned application, such as may be utilized to respond to various service provider or MNO requests, to provide periodic updates to service providers and/or MNOs, or to facilitate billing and payment functions. Application status messages can be transmitted as MNO communications 208 via the MNO gateway 134 and/or as service provider communications 210 via the service provider gateway 133, each according to the common MNO and service provider messaging standards, respectively.

In one example, in response to a request from a service provider computer 160 regarding a specific end user (e.g., as identified by name, account, or other unique identifier), the TSM computer 110 is operable to identify the end user as having a TSM-provisioned application installed. The TSM computer 110 may identify the end user by a secure element identifier (e.g., the ICCID, IMSI, etc. associated with the secure element). The mobile phone number (i.e., MSISDN) may be used as a secondary identifier of the end user. Upon identifying the end user, the TSM computer may perform one or more of, but not be limited to, the following functions when managing the application lifecycle: check the application state on an end user mobile device and/or secure element; update an application version on an end user mobile device and/or secure element; lock or unlock an application on an end user mobile device or secure element; remove an application from an end user mobile device or secure element; process a request indicating that the mobile device and/or secure element is lost or stolen; update a customer phone number and mobile device; update a secure element identity (e.g., ICCID); update an end user's authentication data; process an MNO subscriber cancellation; process a service provider end user cancellation; process application service messages; send an end user and/or mobile device MNO or service provider messages; or lock or unlock one or more of the provisioned applications.

The method 300 may end after block 350, having facilitated the provisioning of mobile device applications and integrating multiple service providers with multiple MNOs and their registered mobile devices, by providing a trusted service manager that promotes simplified integration via common gateways and interfaces implementing common messaging standards.

According to an aspect of the invention, methods for authenticating mobile device communications may be provided. In certain embodiments, an originating device for a communication (e.g., a mobile device, a TSM computer, etc.) may utilize a shared secret between the originating device and an intended recipient device to generate a PAC, and the PAC may be associated with the communication. In this regard, when the communication is received and processed by the recipient device, the PAC may be evaluated, and a determination may be made as to whether the communication is a valid or authenticated communication. FIG. 4 illustrates a flow diagram of an example method 400 for authenticating a mobile device communication, according to an example embodiment of the invention. The method 400 may be performed by a suitable trusted service management system, such as the system 100 illustrated in FIG. 1. For example, a suitable TSM computer, such as the TSM computer 110 illustrated in FIG. 1, and/or a suitable mobile device, such as one of the mobile devices 150a, 150b illustrated in FIG. 1, may perform the method 400. The method 400 may begin at block 405.

At block 405, a communicating or originating device for a communication may identify a shared secret with an intended recipient of a message. The message may be any suitable message that may be communicated via a mobile network, such as a message associated with a transaction. The communicating device may be any suitable device or system configured to generate (or forward) a communication that may be validated or authenticated by a recipient device. For example, the communicating device may be a TSM computer 110 or other suitable service provider configured to generate communications to be transmitted to a mobile device 150. As another example, the communicating device may be a mobile device 150 configured to generate communications for transmission to a service provider, such as the TSM computer 110.

The shared secret may include any suitable secret, token, and/or other information that facilitates the validation or authentication of communications or PACs. A wide variety of different types of shared secrets may be identified and/or utilized as desired in various embodiments of the invention. Examples of suitable shared secrets include, but are not limited to, basic authentication secrets, such as user access credentials (e.g., a user name and password, etc.), certificate-based authentication secrets, such as digital certificates and/or private-public key pairs, and/or token-based authentication secrets, such as a two-factor authentication method in which tokens are independently generated for each communication (e.g., DUKPT authentication, etc.).

At block 410, an identified shared secret may be utilized by the communicating or originating device to generate a PAC for the message. The PAC may be any suitable code or identifier that may be validated or authenticated by a recipient device. Additionally, a wide variety of suitable methods may be utilized to generate or derive the PAC from a shared secret. For example, a code or identifier may be encrypted utilizing a shared secret. As another example, a PAC may include an encrypted code and an identifier of a transaction specific code that may be utilized to decrypt the code (e.g., an identifier of a DUKPT code to be utilized to decrypt the code). Once the PAC is generated, the PAC may be associated with the communication or message at block 415. For example, the PAC may be added to a header of the communication. As another example, the PAC may be appended to the communication and/or to one or more payloads included in the communication.

At block 420, the communication may be formatted, and one or more payloads included in the communication may be encrypted. In certain embodiments, the communication may be formatted in accordance with a desired protocol or formatting standard for communications between the communicating device and the recipient device. For example, a formatting standard established by the TSM computer 110 may be utilized to format the communication and/or various payload data included in the communication. Additionally, as desired, a wide variety of suitable encryption techniques may be utilized to encrypt one or more payloads of the communication. In one example embodiment, the shared secret utilized to generate the PAC may also be utilized as an encryption technique for encrypting one or more payloads of the communication. In another example embodiment, an encryption technique other than that associated with a shared secret may be utilized to encrypt one or more payloads of the communication. For example, a shared secret (e.g., user access credentials, a public/private key pair, etc.) may be utilized to generate a PAC that includes an identifier of a transaction specific key that may separately be utilized to decrypt one or more payloads of the communication. Indeed, a wide variety of different encryption techniques and/or combinations of encryption techniques may be utilized as desired to generate a PAC and/or to encrypt one or more payload components of a communication.

In certain embodiments of the invention, any number of suitable authentication modules and/or applications may be utilized by the communicating device to generate a PAC, associate the PAC with a communication, format the communication, and/or encrypt one or more payloads of the communication. For example, a mobile device 150 may utilize an authentication application or module that has been previously provisioned to a secure element of the mobile device 150 to associate PACs with communications. One example method for provisioning such an application is described in greater detail below with reference to FIG. 5. In certain embodiments, an application that generates a communication, such as a mobile wallet application 156, may invoke or utilize the authentication application to associate a PAC with the communication. In this regard, third party applications that have been provisioned to or loaded on a mobile device 150 may have the authentication application process communications that are transmitted to a TSM computer 110. Similar to a mobile device 150, a TSM computer 110 may utilize a suitable authentication application to associate a PAC with a communication to be sent to a mobile device 150.

At block 425, the communication may be output by the communicating device for transmission to the recipient device, and the communication may be received by the recipient device at block 430. Any number of suitable networks may facilitate the transmission of the communication to the recipient device. Additionally, in certain embodiments of the invention, one or more intermediary systems and/or devices may forward communications during the transmission. For example, a communication output by a mobile device 150 via a mobile carrier network may be processed and/or forwarded to an intended recipient device, such as a TSM computer 110, via any number of suitable MNO computers 140. As another example, a communication output by a TSM computer 110 via a mobile carrier network may be processed and/or forwarded to an intended recipient device, such as a mobile device 150, via any number of suitable MNO computers 140. As a result of associating a PAC with the communication, the contents of the communication may be validated regardless of the transmission path and/or number of intermediary parties.

At block 435, the recipient device may identify an originator of the received communication. In other words, the recipient device may identify the communicating device that output the communication. A wide variety of suitable information and/or evaluation techniques may be utilized as desired to identify the communicating device. For example, a device identifier associated with the communication (e.g., a telephone number, a virtual address, a physical device identifier, etc.) may be determined and utilized to identify the originating device. As another example, device identifying information associated with the establishment of a communications session between the communicating device and the recipient device may be evaluated in order to identify the communicating device. As desired, a device identifier and/or other identifying information associated with the communication may be validated in order to determine whether the communicating device is permitted to communicate with the recipient device. For example, a determination may be made by a TSM computer 110 as to whether a mobile device 150 is registered with the TSM computer 110.

Once the originator of the received communication has been identified by the recipient device, operations may continue at block 440, and a shared secret between the recipient device and the communicating device may be identified or determined. For example, an identity of the communicating device may be utilized to access and/or search a memory containing shared secret information, and shared secret information between the communicating device and the recipient device may be determined. As set forth in greater detail above with reference to block 405, a wide variety of different types of shared secrets may be utilized as desired in various embodiments of the invention.

At block 445, a PAC associated with the communication may be identified, and identified shared secret information may be utilized to evaluate the PAC. For example, a PAC included in a header of the communication or a PAC that is appended to the communication may be identified. Shared secret information, such as key information, may then be utilized to decrypt the identified PAC. At block 450, a determination may be made as to whether the PAC is a valid PAC. For example, a determination may be made as to whether the PAC was successfully decrypted by the shared secret information. Additionally, as desired, a determination may be made as to whether the decrypted PAC has an expected and/or appropriate format. For example, a determination may be made as to whether information included in the PAC satisfies one or more predetermined rules and/or parameters.

If it is determined at block 450 that the PAC is not a valid PAC, then operations may continue at block 455. At block 455, the communication may be identified as an invalid communication and, as desired, any number of alerts and/or exceptions may be generated or triggered by the recipient device. Additionally, in certain embodiments, a potential security risk may be identified. In certain embodiments, an error message may be returned to the communicating device indicating that the communication is not valid. Additionally, in certain embodiments, an error message may be output to a user of a recipient device. In other embodiments, error messages may be communicated to any number of desired recipients, such as TSM personnel, MNO operators, service providers, and/or other recipients. In certain embodiments, the received communication may be associated with a request, such as a request to establish a communications session or a request to complete a transaction. If it is determined that the PAC is not valid, then the request may be denied.

If, however, it is determined at block 450 that the PAC is a valid PAC, then operations may continue at block 460. At block 460, the communication may be authenticated and/or identified as a valid communication. At block 465, one or more payloads of the communication may be decrypted utilizing a wide variety of different authentication information, such as the shared secret or additional authentication information (e.g., a separate key, a transaction specific key identified by the PAC, etc.). As desired, one or more decrypted payloads may be evaluated in order to determine whether the payload information is formatted in accordance with one or more predetermined formatting rules and/or parameters, such as formatting parameters established by the TSM computer 110. In the event that a payload is not properly formatted, an error may be returned to the communicating device.

Additionally, in certain embodiments, once one or more payloads have been decrypted, the communication may be processed by the recipient device. For example, a request included in the communication (e.g., a transaction request, etc.) may be processed. As desired, one or more communications to be returned to the communicating device may be generated based upon the processing of the communication. According to an aspect of the invention, a PAC may be generated and associated with a return communication prior to transmitting the return communication in response to the original communication.

The method 400 may end following either block 455 or block 465.

Figure 5:
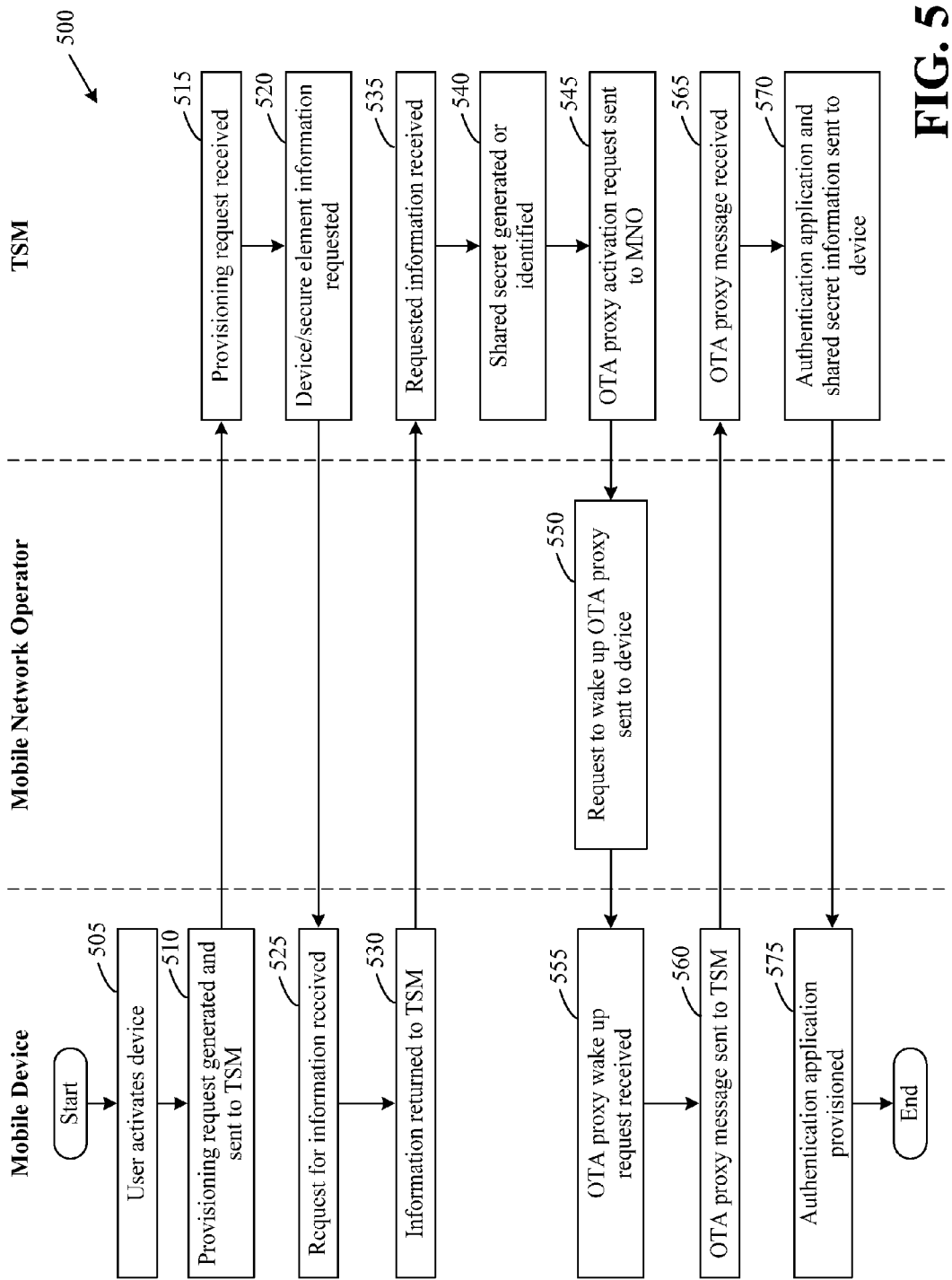
FIG. 5 illustrates a flow diagram of an example process for provisioning an authentication application to a mobile device, according to an example embodiment of the invention.

FIG. 5 illustrates a flow diagram of an example method 500 for providing an authentication application, such as an application that generates and/or evaluates PACs, to a mobile device, according to an example embodiment of the invention. The method 500 may be performed by a suitable trusted service management system, such as the system 100 illustrated in FIG. 1. The method 500 may begin at block 505.

At block 505, a user may activate a mobile device, such as one of the mobile devices 150 illustrated in FIG. 1. In certain embodiments, the activation of the mobile device 150 may be an initial activation of the mobile device 150. In other embodiments, the activation of the mobile device 150 may be an activation following a software update to the mobile device 150 by an MNO, such as the MNO computer 140 illustrated in FIG. 1. Based upon an activation of the mobile device 150, the mobile device 150 may attempt to establish contact with a TSM computer, such as the TSM computer 110 illustrated in FIG. 1. In this regard, a secure element associated with the mobile device 150 may be provisioned and/or personalized.

At block 510, an authentication provisioning request may be generated by the mobile device 150 and output for communication to the TSM computer 110. For example, a request for the provisioning of an authentication application may be generated and output. In certain embodiments, the request may be generated during an enrollment process of the mobile device 150 with the TSM computer 110. In other embodiments, the request may be generated during a setup process for the secure element.

The request may be received by the TSM computer 110 at block 515. As desired in various embodiments, any number of suitable networks and/or communications techniques may be utilized to facilitate the communication of the request to the TSM computer 110. For example, the request may be communicated via a suitable carrier network, such as one of the carrier networks 180 illustrated in FIG. 1. In certain embodiments, the request may be communicated directly to the TSM computer 110. In other embodiments, the request may be communicated through any number of intermediary systems and/or devices, such as an MNO computer 140. In certain embodiments, a secure communications channel may be established between the mobile device 150 and the TSM computer 110 either prior to the communication of the authentication provisioning request or as a result of the communication.

At block 520, the TSM computer 110 may generate a request for various identification information associated with the mobile device 150 and/or the secure element, such as CPLC information and/or secure element identification information, and the generated request may be communicated to the mobile device 150. A wide variety of different types of identifying information may be requested as desired in various embodiments of the invention. At block 525, the request for identifying information may be received and processed by the mobile device 150. The requested information may then be communicated by the mobile device 150 to the TSM computer 110 at block 530, and the TSM computer 110 may receive the requested information at block 535. As an alternative to the TSM computer 110 requesting identifying information, various identifying information may be included in the initial authentication provisioning request. Additionally, in certain embodiments of the invention, a secure communications channel may be established between the mobile device 150 and the TSM computer 110 prior to the communication of identifying information to the TSM computer 110.

As desired, the TSM computer 110 may perform any number of suitable authentication procedures utilizing the identifying information. For example, as explained in greater detail above with reference to FIG. 3, the TSM computer 110 may determine whether the mobile device 150 is a valid device that is capable of and/or that is authorized to receive an authentication application. In certain embodiments, the TSM computer 110 may verify identifying information against information received from a device manufacturer and/or an MNO computer 140. In the event that the TSM computer 110 determines that the mobile device 150 is not capable of and/or not authorized to receive an authentication application, the TSM computer 110 may communicate an appropriate error message to the mobile device 150. Otherwise, operations may continue at block 540.

At block 540, the TSM computer 110 may generate, identify, and/or determine a shared secret between the TSM computer 110 and the mobile device 150 (and/or the secure element). In other words, the TSM computer 110 may identify an authentication proceeding that may be utilized by the TSM computer 110 and/or the mobile device 150 to generate and/or verify PACs that will be associated with communications. A wide variety of different types of shared secrets may be utilized as desired in various embodiments of the invention. For example, basic authentication information, such as user access credentials (e.g., a user name and password, etc.), may be identified as a shared secret. As another example, a certificate-based authentication (e.g., a digital certificate, etc.), such as a certificate-based authentication that utilizes a private-public key pair, may be identified as a shared secret. As yet another example, token-based authentication, such as a two-factor authentication system in which tokens are independently generated for each communication (e.g., DUKPT authentication, etc.), may be identified as a shared secret. In certain embodiments, the provisioning of an authentication application to the mobile device 150 may facilitate the use of certain types of shared secrets, such as token-based authentication. With other types of shared secrets, it will be appreciated that it may not be necessary to provision and/or install an authentication application or authentication software to the mobile device 150. Indeed other software associated with the mobile device 150 may facilitate authentication of communications.

In certain embodiments of the invention, identifying information received from the mobile device 150 may be utilized to generate or derive a shared secret. For example, an identifier of a secure element may be combined with other information, such as a base level key, to derive a shared secret (e.g., a derived key). As another example, identifying information and/or a base level key may be independently utilized by the mobile device 150 and the TSM computer 110 to derive unique transaction specific keys that may be utilized with each communication. For example, identifying information and/or a base level key may be utilized to derive an intermediary key that is provided to a DUKPT process in order to generate or derive any number of transaction specific keys that may be utilized as a shared secret.

At block 545, the TSM computer 110 may request an MNO computer 140 associated with the mobile device 150 to activate or wake up an OTA proxy or OTA proxy application associated with the mobile device 150. For example, the MNO computer 140 may be requested to wake up an OTA proxy that is stored on a general or shared memory or general operation chip associated with the mobile device 150. The OTA proxy activation request may be received by the MNO computer 140 at block 550, and the MNO computer 140 may communicate an appropriate OTA proxy wake up request to the mobile device 150. The OTA proxy wake up request may be received by the mobile device 150 at block 555, and a suitable OTA application associated with the mobile device 150 may communicate an OTA proxy message to the TSM computer 110 at block 560. The OTA proxy message may be received by the TSM computer 110 at block 565, and an OTA communications session may be established between the mobile device 150 and the TSM computer 110.

At block 570, an authentication application and information associated with a shared secret, such as key information and/or information utilized to derive a shared secret (e.g., a base level key, etc.) may be driven to the mobile device 150 by the TSM computer 110. In other words, the mobile device 150 may be provisioned with the authentication application. Additionally, as desired, at least a portion of the received identifying information may be stored for subsequent access by the TSM computer 110 during authentication processing. For example, the stored identifying information may be utilized by the TSM computer 110 as a shared secret to generate and/or evaluate PACs and/or to encrypt and/or decrypt communications.

The authentication application and the shared secret information may be received by the mobile device 150 at block 575. In certain embodiments, the authentication application may be stored on or provisioned to a secure element associated with the mobile device 150. For example, a general purpose chip associated with the mobile device 150 may receive the authentication application via an established OTA session, and the general purpose chip may provide the received authentication application to the secure element. Once provisioned, the authentication application and the shared secret information may be utilized to generate and/or evaluate PACs associated with communications between the mobile device 150 and the TSM computer 110. Additionally, the authentication application and the shared secret information may be utilized to encrypt and/or decrypt communication payloads.

The method 500 may end following block 575.

Figure 4:
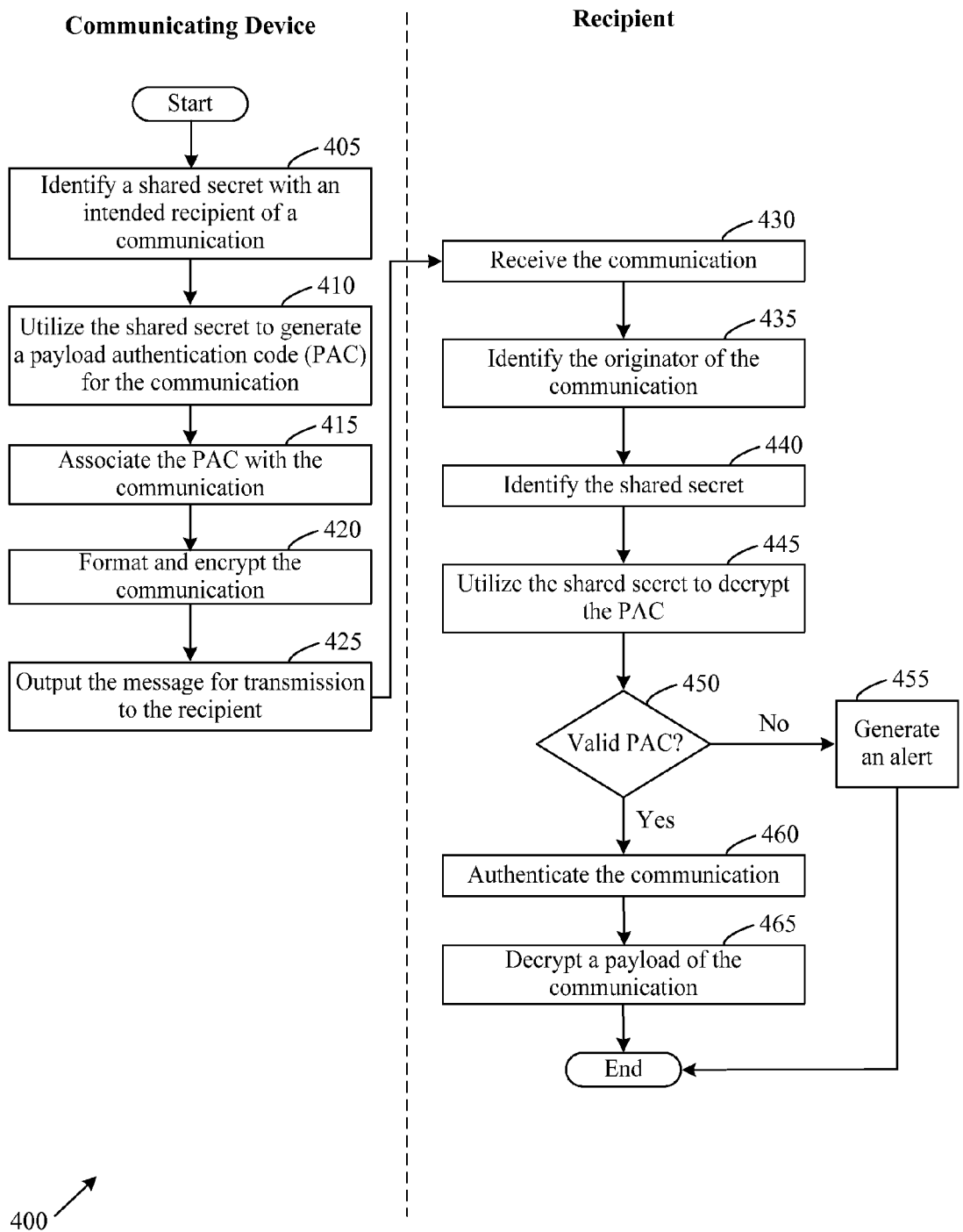
FIG. 4 illustrates a flow diagram of an example process for authenticating a communication, according to an example embodiment of the invention.

The operations described and shown in the methods 300, 400, and 500 of FIGS. 3-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-5 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A computer-implemented method for authenticating communications, the method comprising:
    receiving, by a service manager computer comprising one or more processors, a first information from one or more service providers associated with the mobile device;
    receiving, by the service manager computer, a second information from one or more mobile network operators associated with the mobile device;
    generating, by the service manager computer, customized information associated with the mobile device based at least in part on the received first information and the received second information;
    receiving, by the service manager computer, a message communicated from a service provider server associated with the one or more service providers to a mobile device;
    receiving, by the service manager computer, from the mobile device, an identifier of a secure element included in a memory of the mobile device;
    generating, by the service manager computer, a shared secret between the service provider server and the mobile device based at least in part on the received identifier and the customized information;
    generating, based upon the shared secret between the service provider server and the mobile device, a payload authentication code (PAC);
    associating the generated PAC with a payload for the message; and
    communicating the message and the generated PAC to the mobile device, wherein the mobile device is configured to utilize the shared secret to verify the PAC and authenticate the message.

2. The computer-implemented method of claim 1, wherein communicating the message and the generated PAC to the mobile device comprises communicating the message and the generated PAC to the mobile device via an intermediary.

3. The computer-implemented method of claim 1, further comprising:
    encrypting the payload of the message.

4. The computer-implemented method of claim 1, further comprising:
    provisioning the mobile device with an application configured to verify the PAC and decrypt the payload.

5. The computer-implemented method of claim 1, wherein generating a PAC based upon a shared secret comprises generating a PAC based upon at least one of a dynamic passcode authentication, or a derived unique key per transaction (DUKPT).

6. The computer-implemented method of claim 1, wherein the shared secret is established during an initial registration of the mobile device with the service provider.

7. The computer-implemented method of claim 1, wherein the message comprises a first message, the PAC comprises a first PAC, and further comprising:
   receiving, from the mobile device, a second message comprising a second PAC generated by the mobile device based upon the shared secret;
   determining, based at least in part upon the shared secret, whether the second PAC is valid; and
   authenticating the second message if it is determined that the second PAC is valid; or
   identifying the second message as an invalid message if it is determined that the second PAC is invalid.

8. A system for authenticating communications, the system comprising:
   at least one memory configured to store computer-executable instructions; and
   at least one processor configured to access the at least one memory and execute the computer-executable instructions to:
      receive a first information from one or more service providers associated with a mobile device;
      receive a second information from one or more mobile network operators associated with the mobile device;
      generate customized information associated with the mobile device based at least in part on the received first information and the received second information;
      receive a message communicated from a service provider server associated with the one or more service providers to the mobile device;
      receive from the mobile device, an identifier of a secure element included in a memory of the mobile device;
      generate a shared secret between the service provider server and the mobile device based at least in part on the received identifier and the customized information;
      generate, based upon the shared secret between the service provider server and the mobile device, a payload authentication code (PAC);
      associate the generated PAC with a payload for the message; and
      direct communication of the message and the generated PAC to the mobile device, wherein the mobile device is configured to utilize the shared secret to verify the PAC and authenticate the message.

9. The system of claim 8, wherein the message and the generated PAC are communicated to the mobile device via an intermediary.

10. The system of claim 8, wherein the at least one processor is further configured to execute the computer-executable instructions to:
   encrypt the payload of the message.

11. The system of claim 8, wherein the at least one processor is further configured to execute the computer-executable instructions to:
   provision the mobile device with an application configured to verify the PAC and decrypt the payload.

12. The system of claim 8, wherein the shared secret comprises at least one of a dynamic passcode authentication, or a derived unique key per transaction (DUKPT).

13. The system of claim 12, wherein the shared secret is established during an initial registration of the mobile device with the service provider.

14. The system of claim 8, wherein:
   the message comprises a first message;
   the PAC comprises a first PAC; and
   the at least one processor is further configured to execute the computer-executable instructions to:
      receive, from the mobile device, a second message comprising a second PAC generated by the mobile device based upon the shared secret;
      determine, based at least in part upon the shared secret, whether the second PAC is valid; and
      authenticate the second message if it is determined that the second PAC is valid; or
      identify the second message as an invalid message if it is determined that the second PAC is invalid.

15. A computer-implemented method for authenticating communications, the method comprising:
   receiving, by a mobile device comprising one or more computer processors, a message output by a service provider server associated with one or more service providers, wherein the one or more service providers are associated with the mobile device;
   sending, by the mobile device, to the service provider server an identifier of a secure element included in a memory of the mobile device;
   identifying, by the mobile device based upon an analysis of the received message, a payload authentication code (PAC) generated by a service manager computer based on a shared secret between the service provider server and the mobile device, wherein the shared secret is based at least in part on the identifier and on customized information associated with a first information from the one or more service providers and a second information from one or more mobile network operators, wherein the one or more mobile network operators are associated with the mobile device;
   verifying, by the mobile device based at least in part upon the shared secret between the mobile device and the service provider server, the PAC; and
   authenticating, by the mobile device based at least in part upon the verification, a payload of the received message.

16. The computer-implemented method of claim 15, wherein receiving a message comprises receiving a message via an intermediary that receives the message output by the service provider and communicates the message to the mobile device.

17. The computer-implemented method of claim 15, further comprising:
   receiving, by the mobile device from the service provider during a provisioning of the mobile device, an application that is executed by a secure element associated with the mobile device to verify the PAC.

18. The computer-implemented method of claim 15, further comprising:
   decrypting, by the application, the payload of the message.

19. The computer-implemented method of claim 15, wherein verifying the PAC based at least in part upon a shared secret comprises verifying the PAC based upon at least one of a dynamic passcode authentication, or a derived unique key per transaction (DUKPT).

20. The computer-implemented method of claim 15, wherein the shared secret is established during an initial registration of the mobile device with the service provider.

21. The computer-implemented method of claim 1, wherein the message comprises a first message, the PAC comprises a first PAC, and further comprising:
   generating, by the mobile device, a second message comprising a second PAC generated by the mobile device based upon the shared secret; and
   outputting, by the mobile device, the second message for communication to the service provider.

wherein the service provider utilizes the shared secret to determine whether the second PAC is valid.

* * * * *